(12) United States Patent
Yu

(10) Patent No.: US 8,877,078 B2
(45) Date of Patent: Nov. 4, 2014

(54) METHOD FOR RECYCLING OF SILICA WASTE AND METHOD FOR PREPARING NANOPOROUS OR SPHERICAL MATERIALS

(75) Inventor: Jong-Sung Yu, Seoul (KR)

(73) Assignee: Korea University Research And Business Foundation, Seoul (KR)

( * ) Notice: Subject to any disclaimer, the term of this patent is extended or adjusted under 35 U.S.C. 154(b) by 238 days.

(21) Appl. No.: 13/097,859

(22) Filed: Apr. 29, 2011

(65) Prior Publication Data

US 2011/0315660 A1  Dec. 29, 2011

(30) Foreign Application Priority Data

Jun. 29, 2010  (KR) ........................ 10-2010-0061978

(51) Int. Cl.
| | |
|---|---|
| *C23F 1/02* | (2006.01) |
| *G01N 31/00* | (2006.01) |
| *C01B 33/12* | (2006.01) |
| *C01B 39/00* | (2006.01) |
| *C01B 39/40* | (2006.01) |
| *C01B 31/12* | (2006.01) |
| *C01B 31/08* | (2006.01) |
| *C01B 37/00* | (2006.01) |
| *B82Y 40/00* | (2011.01) |
| *B82Y 30/00* | (2011.01) |

(52) U.S. Cl.
CPC ............ *B82Y 30/00* (2013.01); *C01P 2004/03* (2013.01); *C01P 2002/01* (2013.01); *C01P 2004/04* (2013.01); *C01B 39/40* (2013.01); *C01P 2006/16* (2013.01); *C01P 2002/72* (2013.01); *C01P 2004/32* (2013.01); *C01B 31/12* (2013.01); *C01B 31/08* (2013.01); *C01B 37/00* (2013.01); *B82Y 40/00* (2013.01); *Y10S 977/888* (2013.01)

USPC ............ 216/56; 423/335; 423/700; 423/702; 436/145; 436/72; 977/888

(58) Field of Classification Search
None
See application file for complete search history.

(56) References Cited

U.S. PATENT DOCUMENTS

| 4,226,837 A | * | 10/1980 | Achenbach et al. .......... 423/710 |
| 4,243,640 A | * | 1/1981 | Hill et al. ...................... 423/132 |
| 4,310,496 A | * | 1/1982 | Achenbach et al. .......... 423/712 |

(Continued)

FOREIGN PATENT DOCUMENTS

| KR | 10-2005-0029362 A | 3/2005 |
| KR | 10-2009-0117549 A | 11/2009 |

OTHER PUBLICATIONS

Schedule and Program Topics from the 2$^{nd}$ Iran International Zeolite Conference; Apr. 29-30, 2010; Tehran University in Tehran, Iran; 5 pages.

(Continued)

*Primary Examiner* — Allan Olsen
(74) *Attorney, Agent, or Firm* — Alston & Bird LLP

(57) ABSTRACT

Disclosed are a method for recycling silica waste and a method for preparing nanoporous material and other valuable silica materials. More specifically, a method for preparing a nanoporous material by recycling silica-containing waste produced from a silica etching process in the synthesis of nanoporous carbon is provided. The present disclosure allows recycling of silica waste in an effective and environment-friendly manner, reduction of consumption of chemical materials, and reduction of chemical waste. Accordingly, the present disclosure enables effective preparation of various valuable nanoporous silica and other silica materials from silica waste released for production of various nanoporous materials.

8 Claims, 21 Drawing Sheets

(56) References Cited

U.S. PATENT DOCUMENTS

| | | | | |
|---|---|---|---|---|
| 4,330,518 | A * | 5/1982 | Kostinko | 423/709 |
| 4,376,106 | A * | 3/1983 | Miyanohara et al. | 423/710 |
| 4,605,542 | A * | 8/1986 | Harada | 423/345 |
| 4,851,376 | A * | 7/1989 | Asami et al. | 501/119 |
| 4,960,573 | A * | 10/1990 | Okutani et al. | 423/22 |
| 5,091,161 | A * | 2/1992 | Harris et al. | 423/163 |
| 5,595,715 | A * | 1/1997 | Roth | 423/328.1 |
| 5,595,717 | A * | 1/1997 | Harper et al. | 423/339 |
| 6,406,678 | B1 * | 6/2002 | Shipley | 423/335 |
| 7,238,295 | B2 * | 7/2007 | Izuta et al. | 216/93 |
| 7,455,780 | B1 * | 11/2008 | Joyner et al. | 210/679 |
| 7,534,411 | B2 * | 5/2009 | Shapira et al. | 423/336 |
| 8,354,088 | B2 * | 1/2013 | Fallavollita | 423/349 |
| 2003/0049199 | A1 * | 3/2003 | Ando et al. | 423/700 |
| 2003/0097970 | A1 * | 5/2003 | Ramme | 110/347 |
| 2003/0152510 | A1 * | 8/2003 | Senderov et al. | 423/713 |
| 2003/0154887 | A1 * | 8/2003 | Oates et al. | 106/707 |
| 2004/0111958 | A1 * | 6/2004 | Oates et al. | 44/505 |
| 2004/0144722 | A1 * | 7/2004 | Zavattari et al. | 210/634 |
| 2004/0200806 | A1 * | 10/2004 | Izuta et al. | 216/99 |
| 2005/0106091 | A1 * | 5/2005 | Shapira et al. | 423/335 |
| 2006/0070406 | A1 * | 4/2006 | Raichel et al. | 65/134.8 |
| 2007/0059238 | A1 * | 3/2007 | Thakur et al. | 423/700 |
| 2008/0250723 | A1 * | 10/2008 | Fragiacomo | 51/298 |
| 2009/0022647 | A1 * | 1/2009 | Farrell et al. | 423/344 |
| 2009/0049653 | A1 * | 2/2009 | Watanabe | 23/295 R |
| 2009/0155548 | A1 * | 6/2009 | Boyer et al. | 428/195.1 |
| 2009/0263307 | A1 * | 10/2009 | Nanis et al. | 423/350 |
| 2010/0032630 | A1 * | 2/2010 | Hariharan et al. | 252/516 |
| 2010/0287827 | A1 * | 11/2010 | Sonwane | 44/623 |
| 2011/0287245 | A1 * | 11/2011 | Shamei et al. | 428/221 |
| 2012/0031306 | A1 * | 2/2012 | Belden et al. | 106/705 |
| 2013/0001816 | A1 * | 1/2013 | Yamahara et al. | 264/37.3 |
| 2013/0068138 | A1 * | 3/2013 | Anastasijevic et al. | 106/405 |

OTHER PUBLICATIONS

Kim, J. H., et al.; "Recrystallization of microporous MFI type zeolite from SBA-15/carbon composite"; Presented at the $2^{nd}$ Iran International Zeolite Conference; Tehran, Iran; Apr. 30, 2010; 3 pages.

* cited by examiner

MCM-41
SBA-3
SBA-15

MCM-48

MCM-50

SBA-1
SBA-6

SBA-6

METHOD FOR RECYCLING OF SILICA WASTE AND METHOD FOR PREPARING NANOPOROUS OR SPHERICAL MATERIALS

CROSS-REFERENCE TO RELATED APPLICATIONS

This application claims priority under 35 U.S.C. §119 to Korean Patent Application No. 10-2010-0061978 filed on Jun. 29, 2010, in the Korean Intellectual Property Office, the disclosure of which is incorporated herein by reference in its entirety.

TECHNICAL FIELD

The present disclosure relates to a method for recycling silica waste and a method for preparing nanoporous or spherical material such as a mesoporous silica, a microporous zeolite or silica spheres. More specifically, it relates to a method for preparing a nanoporous or spherical material such as a mesoporous silica, a microporous zeolite or silica spheres by recycling silica-containing waste produced from a silica etching process in the synthesis of nanoporous carbon.

BACKGROUND

Nanotechnology (NT) collectively refers to a technology of manufacturing, manipulating or analyzing matter on a nanometer scale. Nanotechnology may be largely classified into synthesis of nanomaterials and application of them. Especially, porous materials have been traditionally used for catalysts, absorbents, support materials, or the like due to their high surface area. These materials are classified into microporous, mesoporous and macroporous materials according to the pore size.

In general, a nanoporous material refers to the microporous material and the mesoporous material. Until the early 1990, zeolite was the representative inorganic microporous material. With a pore size of 2 nm or smaller, zeolite is also called the molecular sieve. Due to a peculiar network structure consisting of aluminum, silicon and oxygen atoms, zeolite can serve as a solid acid and an ion exchanger. Therefore, it has been usefully utilized in many applications. For example, it can be used to selectively adsorb or separate molecules suiting the pore size, and has been used for cracking and reforming reactions in the petrochemical industry due to its specific acid sites or by supporting of catalytically active materials. Recently, it is also used as a support for various nanomaterials due to its nano-sized pores. However, since the pore size of zeolite is relatively small, its application for larger molecules is limited. Hence, it has been a challenge to synthesize a material which has the properties of zeolite but a larger pore size.

In 1992, Mobil announced the synthesis of M41S mesoporous silica families including MCM-41 and MCM-48 (MCM stands for Mobil Composition of Matter). As shown in the electron microscopic image of FIG. 1, these materials have very uniform nanometer-sized pores, which are arranged regularly like the honeycomb. Most importantly, the pore size can be tuned between 2 nm and 30 nm by varying the synthesis conditions. The synthesis of these materials became a turning point in the nanopore research, and mesoporous materials of various structures were synthesized by many researchers afterward. For example, SBA-15, which is synthesized from an ethylene oxide (hydrophilic)-propylene oxide (hydrophobic) block copolymer as a template material under an acidic condition (pH=1-2), has a pore size of 5-30 nm and is known to be hydrothermally stable, with a relatively large silica wall thickness (ca. 3-6 nm). HMS (standing for hexagonal mesoporous silica) is synthesized using a neutral surfactant such as alkylethylene oxide (BRIJ). Spherical silica is bound to the surfactant through hydrogen bonding. MSU (standing for Michigan State University) is synthesized under a neutral condition, using polyethylene oxide (PEO) as a biodegradable, non-ionic, neutral surfactant. MCM-41 and MCM-48 may be synthesized under a basic condition using a cationic surfactant such as cetyltrimethylammonium bromide (CTAB) as a template material.

Furthermore, researches about the use of these mesoporous materials as catalyst and for other applications are also increasing. Especially, researches are actively carried out in the field of nanochemistry, nanotechnology, supramolecular chemistry, or the like.

These mesostructures may be formed by controlled packing of micelles or inverse micelles of various structures which are prepared from a variety of surfactants and amorphous silica. Alkoxysilanes such as tetramethyl orthosilicate (TMOS), tetraethyl orthosilicate (TEOS) are usually employed as a silica source.

Recently, attempts have been made to replace the organosilicates, which are relatively expensive, produce waste during the manufacturing process, and are potentially environmentally harmful themselves, with silicon dioxide, natural silicate materials, kanemite, water glass, silica gel, or the like as a silica precursor, which are naturally occurring and produce less waste.

SUMMARY

The present disclosure is directed to providing a method for recycling silica waste to a more useful material and a method for preparing a nanoporous or spherical material. The present disclosure allows the recycling of silica waste produced from a silica etching process in the synthesis of nanoporous carbon, thus not only helping in saving valuable chemicals, but also in decreasing chemical waste, which contribute in improvement of our environmental standard.

In one general aspect, the present disclosure provides a method for recycling silica waste, wherein silica waste produced from a silica etching process in the synthesis of nanoporous carbon is used as a silica precursor for preparation of mesoporous silica, microporous zeolite or silica spheres.

In another general aspect, the present disclosure provides a method for preparing mesoporous silica, microporous zeolite or silica spheres, the method including: 1) preparing a silica precursor by purifying silica waste produced from a silica etching process in the synthesis of nanoporous carbon; and 2) introducing the silica precursor into a surfactant micelle as a structure-directing agent.

In another general aspect, the present disclosure provides a method for preparing nanoporous carbon, microporous zeolite or silica spheres, the method including: 1) preparing the mesoporous silica prepared from the method for preparing mesoporous silica as a template; 2) filling a carbon source in the pores of the mesoporous silica and pyrolyzing the same to prepare a mesoporous silica/carbon composite; and 3) etching the silica from the mesoporous silica/carbon composite.

In another general aspect, the present disclosure provides a method for method for analyzing a mesoporous material, including analyzing structure and physical and chemical properties of the recycled mesoporous silica prepared from the method for preparing mesoporous silica or the nanoporous carbon prepared from the method for preparing nanoporous carbon.

Other features and aspects will be apparent from the following detailed description, the drawings, and the claims.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
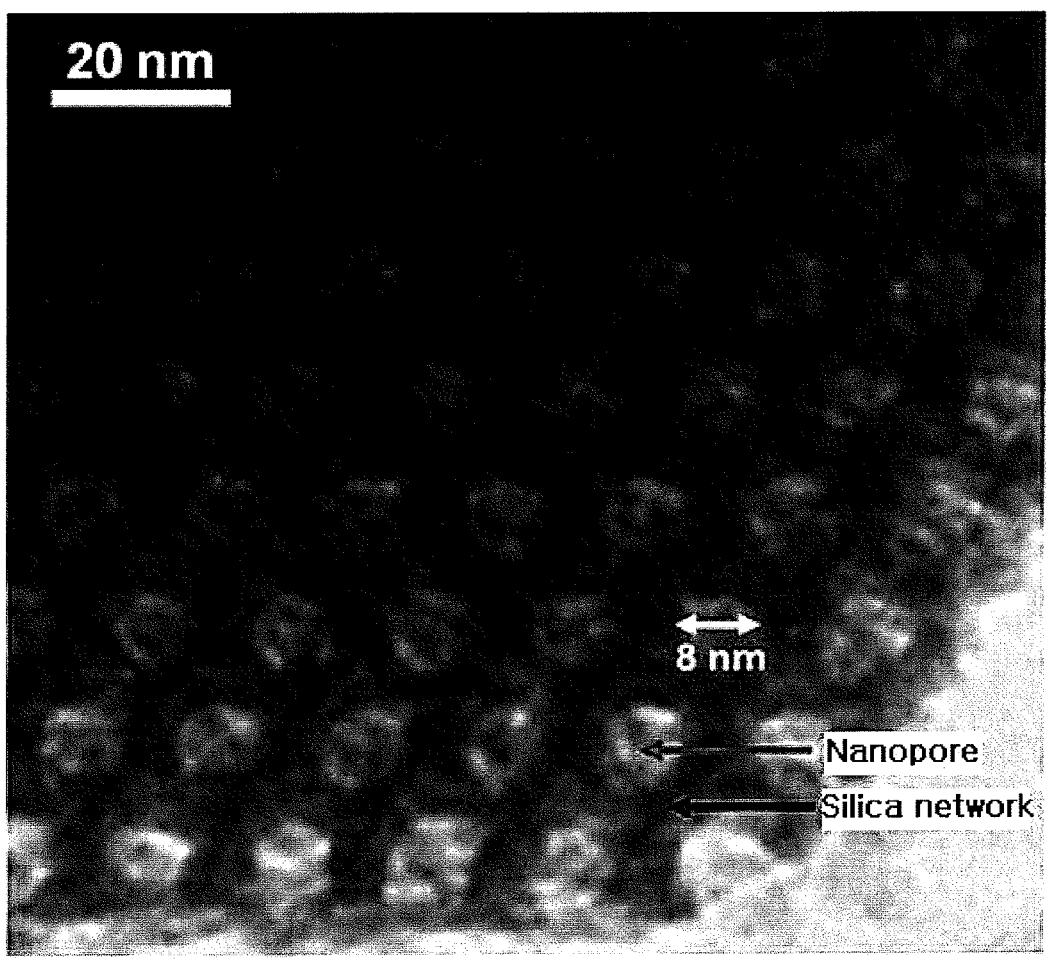
FIG. 1 is an electron microscopic image of an existing mesoporous material.

The advantages, features and aspects of the present disclosure will become apparent from the following description of the embodiments with reference to the accompanying drawings, which is set forth hereinafter. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. The terminology used herein is for the purpose of describing particular embodiments only and is not intended to be limiting of the example embodiments. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, a "nanoporous" material (e.g. a nanoporous silica and a nanoporous carbon) refers to the microporous materials (e.g. 0.2-2 nm) and/or the mesoporous materials (e.g. 2-50 nm).

Hereinafter, exemplary embodiments will be described in detail with reference to the accompanying drawings.

In general, mesoporous materials are synthesized from sol-gel reaction or hydrothermal reaction using organic molecules such as surfactant as a structure-directing agent. The surfactant may be a cationic surfactant such as cetyltrimethylammonium bromide (CTAB), an anionic surfactant such as sodium dodecyl sulfate (SDS), or a block copolymer or neutral surfactant such as P123, F127 and BRIJ (e.g., a neutral alkylethylene oxide surfactant). As a typical example, a cationic surfactant composed of a hydrophilic head and a hydrophobic tail forms various micellar or liquid crystal structures through self-assemblage in an aqueous solution. The resulting various supramolecules may be used as template to synthesize mesoporous materials of desired shape.

As one of the mechanisms for synthesis of mesoporous materials, the liquid crystal templating mechanism is based on the fact that the pore structure of synthesized inorganic materials is very similar to that of liquid crystals. That is to say, after a sort of supramolecule composed of a surfactant or a polymer is formed in an aqueous solution, a hydrophilic moiety on the surface interacts with inorganic materials such as silicate to form an organic/inorganic nanocomposite. Then, a mesoporous material can be obtained by removing the surfactant.

At present, mesoporous materials are used in many applications, including catalysts, supports for nanomaterials, adsorption and separation, sensors, or the like. For such applications, it is important to control the pore networking, pore volume and surface area according to purposes. Furthermore, it is necessary to control the pore size according to the size of the molecules or materials that will be accommodated in the pores of the mesoporous material, and the structural change and physical properties of the mesoporous material are also of great importance.

Figure 2:
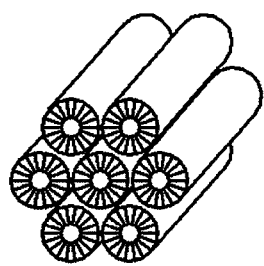
FIG. 2 schematically shows various structures of existing mesoporous materials.
Figure 2:
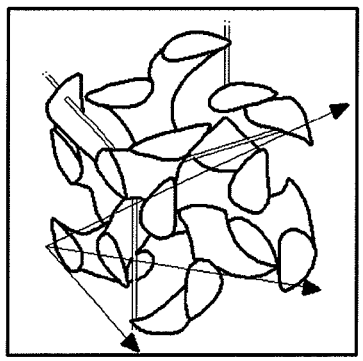
Figure 2:
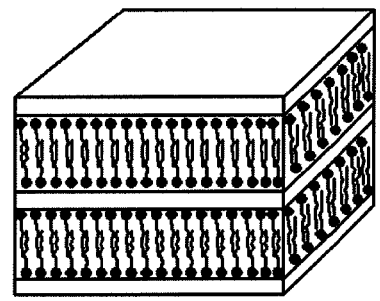
Figure 2:
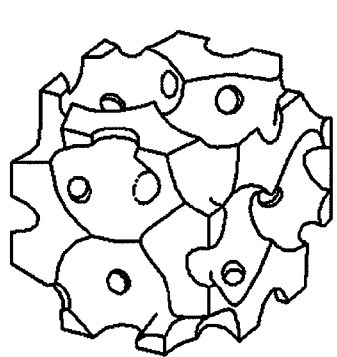
Figure 2:
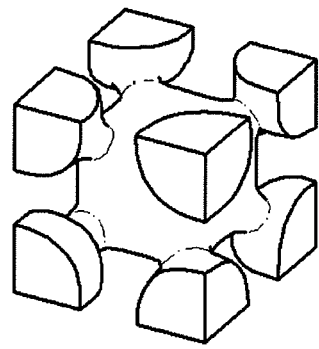

Since the discovery of MCM-41 and MCM-48 in 1992, a variety of mesoporous materials have been synthesized and reported (FIG. 2). To give a brief description about their structure, MCM-41, SBA-3 and SBA-15 (SBA stands for Santa Barbara) has a hexagonal regular arrangement (hexagonal P6 mm) of cylindrical nanopores, and MCM-48 has a body-centered cubic structure (cubic laid) wherein two kinds of nanopores are independently and 3-dimensionally interconnected. MCM-50 has a lamellar structure, SBA-1 and SBA-6 consist of spherical mesopores of a cubic Pm3n lattice structure interconnected 3-dimensionally, and SBA-16 has a cubic Im3m lattice structure. Besides, other SBA-family materials wherein mesopores are regularly arranged and KIT-1 (KIT stands for Korea Advanced Institute of Science and Technology), MSU-X and HMS wherein mesopores are irregularly arranged are reported.

Since the surfactant may have various liquid crystal structures in an aqueous solution depending on concentration or temperature, mesoporous materials with different structures, e.g., MCM-41, MCM-48 and MCM-50, can be synthesized from the same surfactant, e.g., CTAB, by changing the synthesis conditions.

In particular, depending on the molar ratio of surfactant/silicate, MCM-41 (<1), MCM-48 (1-1.5), MCM-50 (1.2-2), or a cubic octamer structure (2) can be obtained. The cubic octamer structure is one in which D4R silicate anions form a complex with the surfactant without being polymerized. In addition to the compositional change of the reactants, the nanopore structure can be varied by adding various cosolvents or cosurfactants.

Recently, synthesis of a mesoporous carbon material comprising a carbon backbone was reported. When the pores of a mesoporous material as a template are filled with a carbon source and the mesoporous material is pyrolyzed, a silica/carbon composite material is obtained. Then, by removing silica selectively, a mesoporous carbon material can be synthesized. Since the resulting mesoporous carbon material has a large surface area of 800-3,000 $m^2/g$, and has good thermal stability and excellent adsorbing and supporting performance, its potential in many areas including electrode material for a fuel cell, Li ion battery and supercapacitor is expected.

However, the process of synthesizing a porous carbon material directly from silica usually requires the selective removal of the silica template from the silica/carbon composite using harmful hydrofluoric acid or sodium hydroxide. Further, additional cost is required in the form of waste treatment.

Nevertheless, there is no report yet concerning the recycling of silica waste into valuable mesoporous silica materials.

In a method for recycling silica waste according to a specific embodiment of the present disclosure, silica waste produced from a silica etching process in the synthesis of nanoporous carbon is used as a silica precursor for preparation of recycled mesoporous silica, microporous zeolites and silica spheres.

The silica waste produced from the silica etching process in the synthesis of nanoporous carbon may be purified by sonication or filtration through ultrafine filter paper.

The silica waste may comprise less than 0.3 wt % of carbon, although not being limited thereto.

A method for preparing recycled nanoporous silica according to a specific embodiment of the present disclosure comprises: 1) preparing a silica precursor by purifying silica waste produced from a silica etching process in the synthesis of nanoporous carbon; and 2) introducing the silica precursor into a surfactant micelle as a structure-directing agent.

In the method for preparing nanoporous silica according to the present disclosure, the silica precursor of the step 1) may be prepared by purifying the silica waste produced from a silica etching process in the synthesis of nanoporous carbon by sonication or filtration through ultrafine filter paper.

The silica precursor of the step 1) may comprise less than 0.3 wt % of carbon, although not being limited thereto.

In the method for preparing mesoporous silica according to the present disclosure, the surfactant of the step 2) may be selected from an ionic surfactant, an amphiphilic polymer surfactant and PLURONIC. The ionic surfactant may be $C_nH_{2n+1}N(CH_3)_3X$ or $C_nH_{2n+1}N(C_2H_5)_3X$ (where n is an integer from 8 to 22, and X is a halogen atom such as Cl, Br, I or F), the amphiphilic polymer surfactant may be $C_nH_{2n+1}(OCH_2CH_2)_xOH$ (where n is an integer from 12 to 23, and x is an integer from 0 to 100), and PLURONIC may be $(EO)_x(PO)_y(EO)_x$ (where 20<x<120, and 20<y<120). More specifically, the surfactant may be CTAB or an ethylene oxide/propylene oxide block copolymer such as PLURONIC P123 (molecular weight=5,750, BASF) or PLURONIC F127 (molecular weight=12,600, BASF).

A method for preparing nanoporous carbon according to a specific embodiment of the present disclosure comprises: 1) preparing the mesoporous silica prepared from the method for preparing mesoporous silica as a template; 2) filling a carbon source in the pores of the mesoporous silica and pyrolyzing the same to prepare a mesoporous silica/carbon composite; and 3) etching the silica selectively from the mesoporous silica/carbon composite.

As described, the present disclosure allows recycling of silica waste in an effective and environment-friendly manner, reduction of consumption of chemical materials, and reduction of chemical waste. Accordingly, the present disclosure enables effective preparation of various valuable nanoporous silica from silica waste generated for production of various nanoporous materials.

Further, the present disclosure provides a method for method for analyzing a nanoporous material, including analyzing structure and physical and chemical properties of the nanoporous silica or nanoporous carbon prepared from the above methods.

The present disclosure will make a good example of green chemistry for saving chemicals and protecting the environment. The present disclosure is also applicable to the synthesis of microporous zeolite, silica spheres and other silica materials in addition to the mesoporous silica materials.

EXAMPLES

The examples and experiments will now be described. The following examples and experiments are for illustrative purposes only and not intended to limit the scope of this disclosure.

Preparation Example

1) Synthesis of SBA-15 Silica Template

A rod-type, 2-D hexagonally ordered mesoporous silica SBA-15 host was prepared. 4.0 g of PLURONIC P123 ($EO_{20}PO_{70}EO_{20}$, BASF) was dissolved in 120 mL of a 2.0 M HCl solution and stirred at 308 K to obtain a homogeneous solution. Then, 8.5 g of tetraethyl orthosilicate (TEOS, 98%, Aldrich) was added to the mixture solution. The initial molar composition of the mixture was P123:HCl:TEOS:$H_2O$=0.012:5.85:1.00:151.6. The mixture was stirred until TEOS was completely dissolved. The mixture was kept in an oven at 308 K for 20 hours, and then maintained at 343 K for 12 hours. The produced white material was filtered, washed with distilled water, dried, and then calcined at 823 K for 6 hours to remove the triblock copolymer template.

2) Preparation of Mesoporous Carbon and Silica Etching Waste

Mesoporous carbon was prepared by a gas-impregnation nanocasting method using the calcined SBA-15 as a hard template. 0.55 g of phenol was incorporated into the mesopores of 1.0 g of the SBA-15 host by heating at 373 K for 5 hours under vacuum. The phenol-incorporated SBA-15 host was reacted paraformaldehyde (0.45 g) under vacuum at 403K for 10 hours to yield a phenol resin/SBA-15 composite. Excess resin was removed under vacuum.

The resultant phenol resin/SBA-15 silica composite was heated under $N_2$ gas flow at a rate of 3 K/min to 1,173 K in a tube furnace, and then carbonized at 1,173 K for 7 hours to prepare a carbon/SBA-15 silica composite. The silica template was selectively dissolved by stirring the composite in a 3.0-3.5 M NaOH solution for 10 minutes and heating overnight in an oven at 353 K. The solid product was filtered, washed with ethanol, and dried at 353 K to obtain CMK-3 mesoporous carbon.

The first filtered effluent containing silica waste was secured for recycling. Since the raw silica waste contains ca. 5 wt % of carbon debris, it was purified by sonication and filtration through ultrafine filter paper (0.05-μm polycarbonate membrane filter, Whatman). The so-obtained silica waste containing less than 0.3 wt % of carbon impurity was used as a precursor for synthesis of valuable nanoporous silica, microporous zeolites, silica spheres and other silica materials.

Example 1

Preparation of Mesoporous Silica (MCM-48 Silica)

To prepare recycled MCM-48 silica, 30 g of the silica waste solution was added to a mixture solution containing 2.4 g of cetyltrimethylammonium bromide (CTAB), 27.3 g of deionized water and 50 g of ethanol, and mixed for 30 minutes by stirring. The final molar composition was CTAB:EtOH:$H_2O$:$Na_2O$:$SiO_2$=0.04:6.82:15.5:0.42:1.00. Subsequently, the mixture of the silica and the surfactant solution was placed in a stainless steel autoclave, heated to 393 K, and held at that temperature for 2 days to yield recycled MCM-48 silica. The synthesized MCM-48 silica was filtered, washed with excess water and ethanol, and dried overnight at 343 K. Some of the as-synthesized recycled MCM-48 silica was pyrolyzed at 873K for 6 hours to calcine the organic template.

Example 2

Preparation of Mesoporous Silica (MCM-41 Silica)

Recycled MCM-41 silica was prepared similarly to the MCM-48. The starting materials were 30 g of silica waste, 2.4 g of CTAB and 135 g of deionized water. The final molar composition was CTAB:$H_2O$:$Na_2O$:$SiO_2$=0.04:53.60:0.42:1.00. The mixture solution was stirred for 30 minutes, charged into a stainless steel autoclave, and heated at 393 K for 2 days. The product was filtered, washed with water/ethanol, and calcined at 873K for 6 hours.

Example 3

Preparation of Mesoporous Silica (SBA-15 Silica)

Mesoporous SBA-15 silica was prepared in the same manner as in Example 1, except for using the triblock copolymer surfactant P123 instead of CTAB.

Example 4

Preparation of Mesoporous Silica (SBA-16 Silica)

Mesoporous SBA-16 silica was prepared in the same manner as in Example 1, except for using the triblock copolymer surfactant F127 instead of CTAB.

Example 5

Preparation of Microporous Zeolite ZSM-5

Silica waste was added into an aqueous solution of 3.0× $10^{-2}$ M $AlCl_3.6H_2O$ (Si/Al molar ratio=10–∞) and mixed for 30 min under vigorous stirring. Either tetrapropylammonium hydroxide (TPAOH) or tetrapropylammonium bromide (TPABr) was used as a templating agent for the synthesis of ZSM-5 zeolite. 2 g of the Al-silica waste was added into 10 g of 1.0 M TPAOH aqueous solution, and mixed for 30 min under vigorous stirring. In the case of using TPABr, 2 g of the Al-silica waste was added into a mixture solution containing 0.22 g of NaOH, 0.32 g of TPABr, and 10 g of deionized water and mixed for 30 min under vigorous stirring. In a subsequent recrystallization process, the mixture of Al-silica waste and TPAOH or TPABr solution was placed into the stainless autoclave, heated to 373 K, and held at that temperature for 24 h. As-synthesized ZSM-5 was filtered, washed with excess water and ethanol, dried at 343K for overnight, and subsequently calcined at 873K for 7 h under air flow to remove the TPAOH or TPABr from the ZSM-5 framework, which results in calcined ZSM-5.

Figure 19:
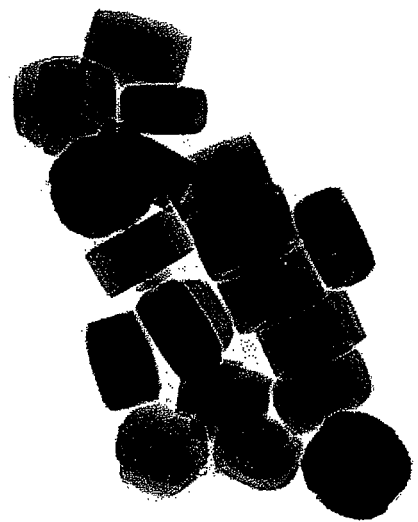
FIG. 19 shows SEM and TEM images of recycled ZSM-5 prepared from silica waste using TPAOH as a template agent for ZSM-5 with Si/Al=35.
Figure 19:
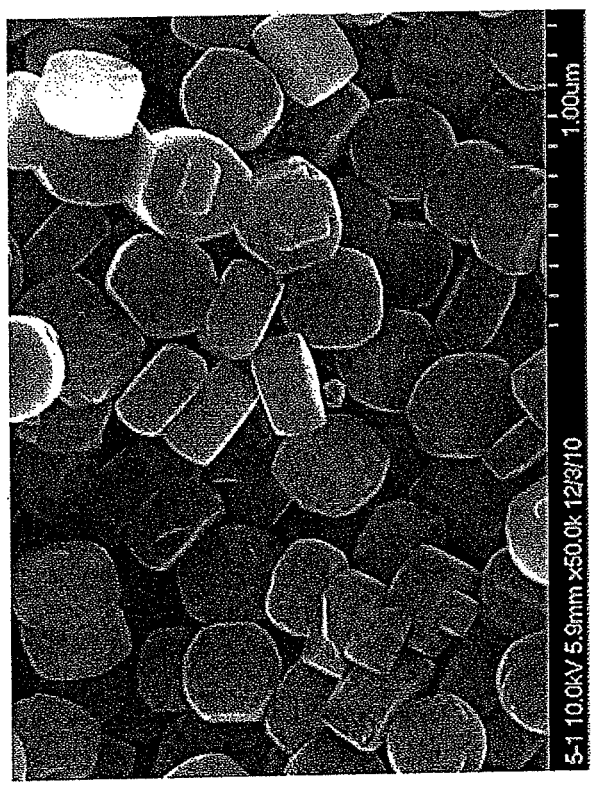

FIG. 19 shows the representative SEM and TEM images of the ZSM-5 zeolite crystals, which were prepared using TPAOH. The ZSM-5 zeolite crystals exhibited typical pseudo-hexagonal plate-like shape.

Figure 20:
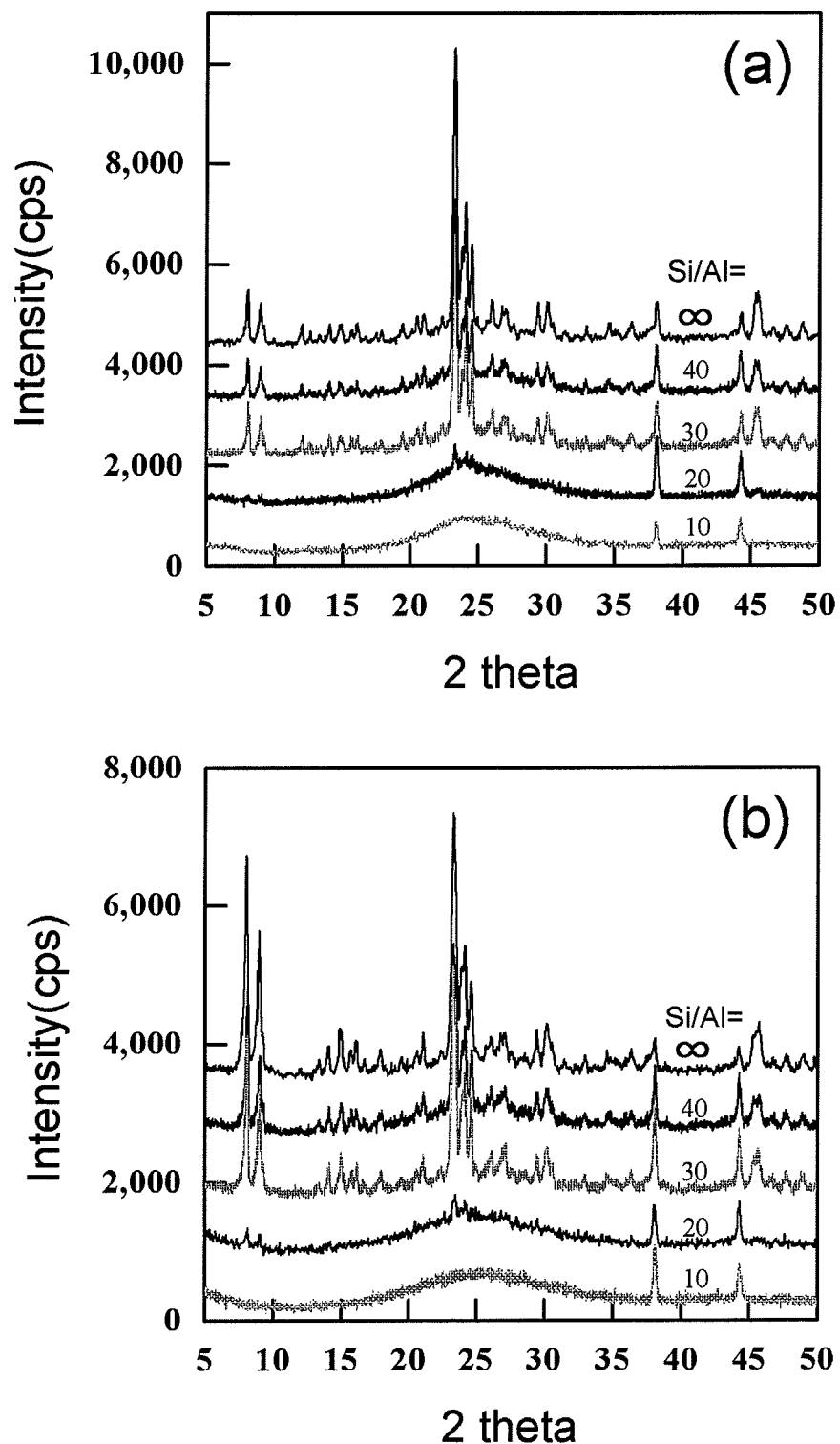
FIG. 20 shows XRD patterns of recycled ZSM-5 (prepared using TPAOH) prepared with different molar ratios of Si to Al (a) in as-synthesized state and (b) in calcined state.

FIG. 20 presents the powder XRD patterns of the as-synthesized and calcined ZSM-5 (prepared using TPAOH) measured to identify the crystal structure of the zeolite. All the diffraction patterns of the resulting zeolite prepared at different Si/Al molar ratios=∞, 40 and 30 in this study agreed well with that of typical ZSM-5 zeolite as previously reported. Two XRD peaks observed at 2θ≈38 and 44 are assigned to an aluminium sample holder for powder XRD measurements. The increase of two peaks at 2θ≈7.5-10.0 after calcination corresponds to the removal of the organic template trapped in the micropores of the ZSM-5 zeolite. The ZSM-5 crystalline structure starts to decrease when the Si/Al ratio in the synthesis medium decreases to 20, and completely disappears at Si/Al=10, indicating that the Si/Al ratio is an important factor for the generation of the ZSM-5 crystals as well as their morphological shape.

Example 6

Preparation of Silica Spheres

Figure 21:
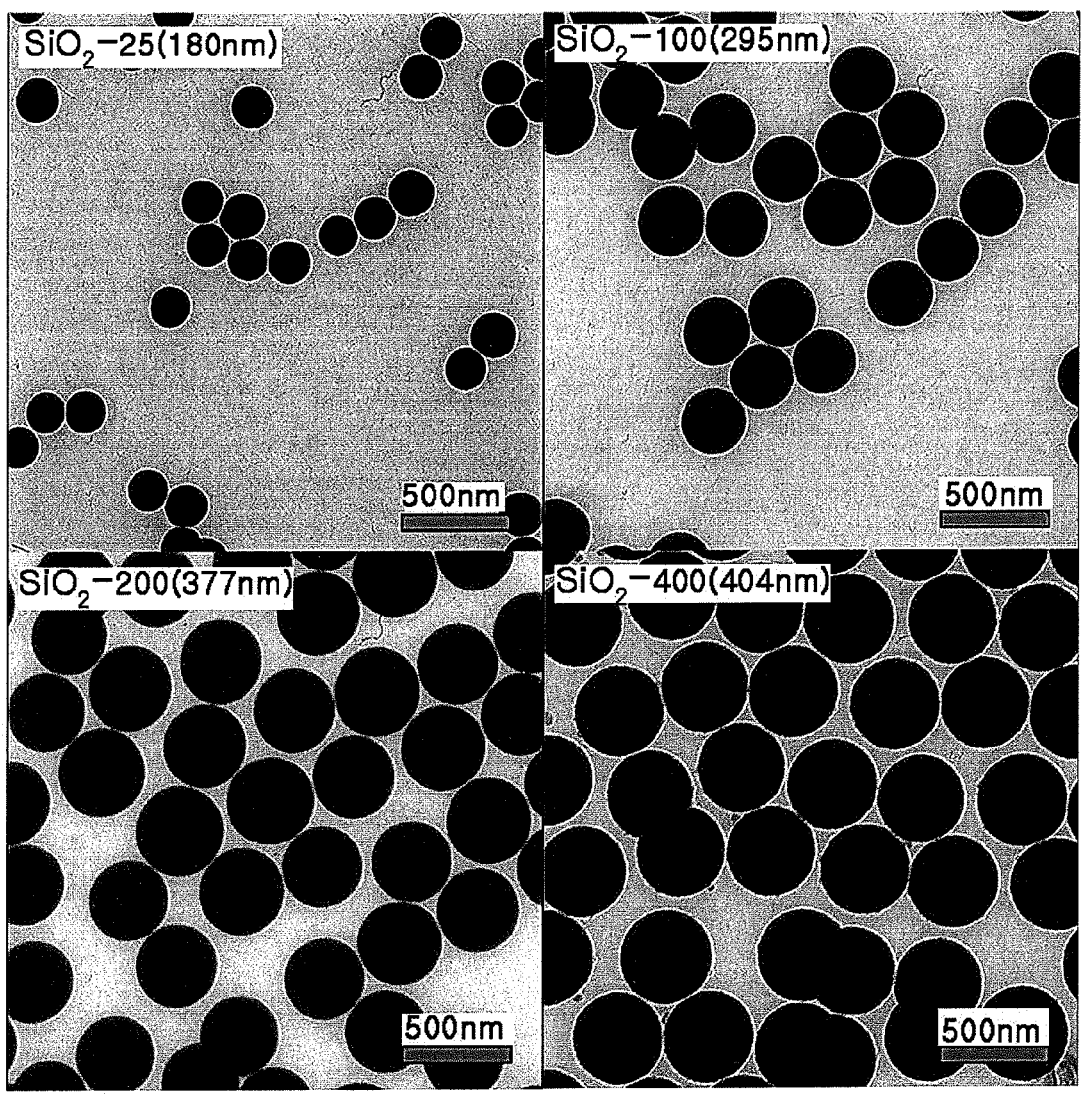
FIG. 21 shows TEM images for silica spheres with different sizes prepared from silica waste of different concentrations as shown for $SiO_2$-25, $SiO_2$-100, $SiO_2$-200 and $SiO_2$-400, respectively, where number indicates the silica waste concentration (mol/liter) used It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

The synthesis of the silica nanoparticles with different sizes are as follows. 40 mL of aqueous ammonia (28 wt %) was added into a solution containing 1000 mL of ethanol and 80 mL of deionized water. 60 mL of silica waste was added into the above-prepared mixture at ambient temperature under vigorous stirring and the reaction mixture was kept stirring for 6 h to yield uniform silica nanoparticles. Interestingly, silica spheres with different sizes have been produced in response to the different silica waste concentrations, and named $SiO_2$—X, where X indicates the silica waste concentration (in mole/liter) used. FIG. 21 shows TEM image of silica nanospherses with different sizes prepared in the experimental conditions.

Test Examples

Figure 3:
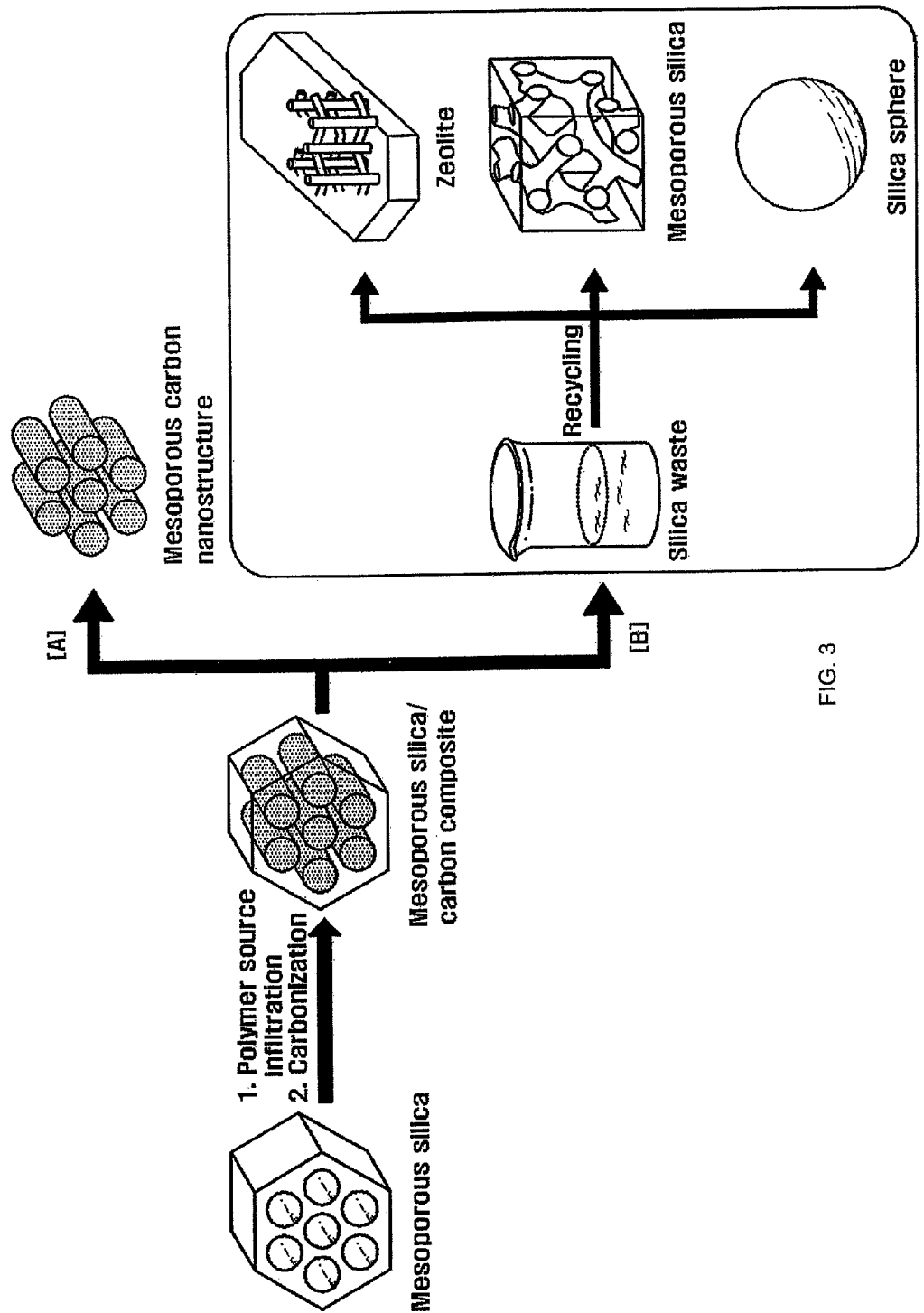
FIG. 3 schematically shows an existing synthesis method of mesoporous carbon as well as a method for recycling silica waste according to a specific embodiment of the present disclosure.

FIG. 3 schematically shows a synthesis route of mesoporous carbon by nanocasting as well as a recycling process for preparation of a mesoporous silica material, microporous zeolite and silica sphere. More specifically, FIG. 3 (*a*) shows a general nanocasting process of SBA-15 for preparation of CMK-3. FIG. 3 (*b*) shows a process for recycling silica waste into valuable mesoporous silica material, microporous zeolite and silica sphere.

The amorphous silica template in the silica/carbon composite is selectively dissolved under basic condition (NaOH solution) to form silicate oligomers like sodium silicate, which then self-assemble with a cationic surfactant (e.g., CTAB) added in the reaction mixture under the basic condition. As a result, a mesoporous silica material can be obtained under proper hydrothermal treatment at high temperature and high pressure. Subsequently, a pyrolysis process of the as-synthesized mesoporous silica to selectively remove the cationic surfactant provides a new recycled, calcined mesoporous silica. Microporous zeolites, silica spheres and other silica materials can be also prepared from the silica waste obtaind in silica etching process of carbon/silica composite. Related figures and explanation are given in FIG. 19-21.

Figure 4:
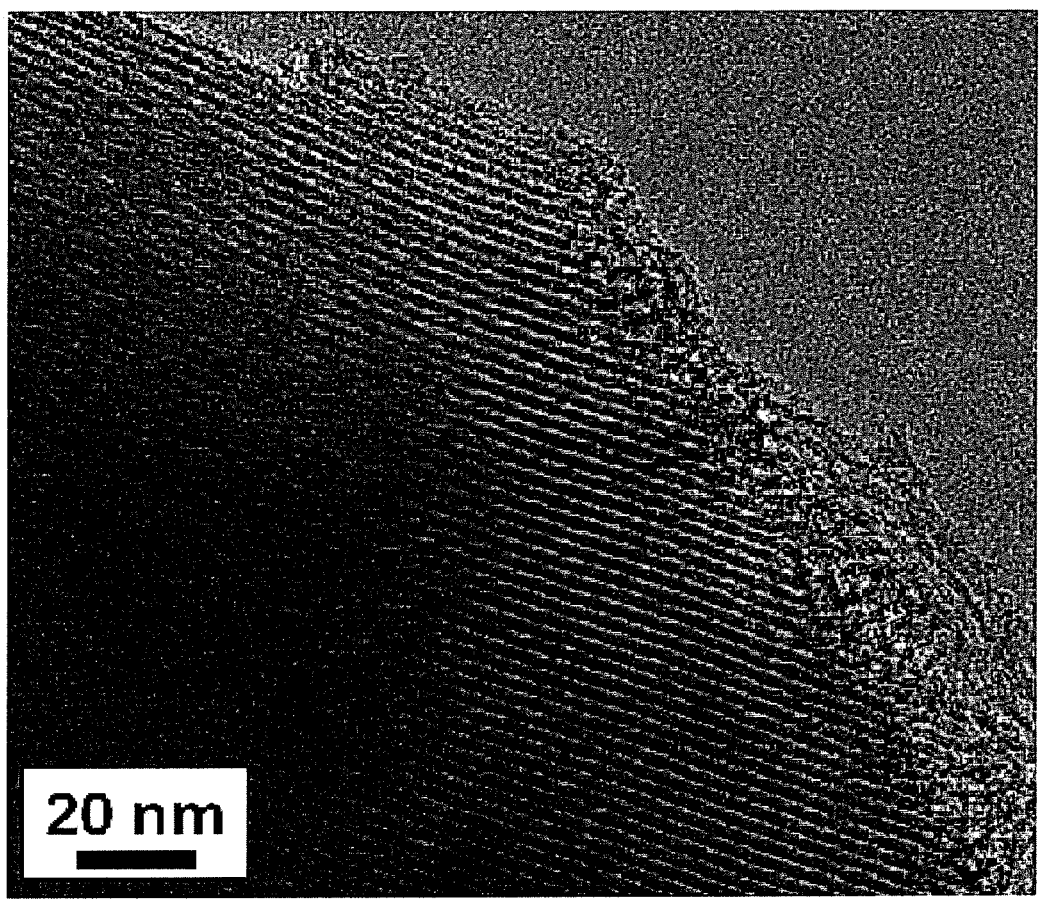
FIG. 4 shows an HR-TEM image of an SBA-15 silica template according to a specific embodiment of the present disclosure.
Figure 5:
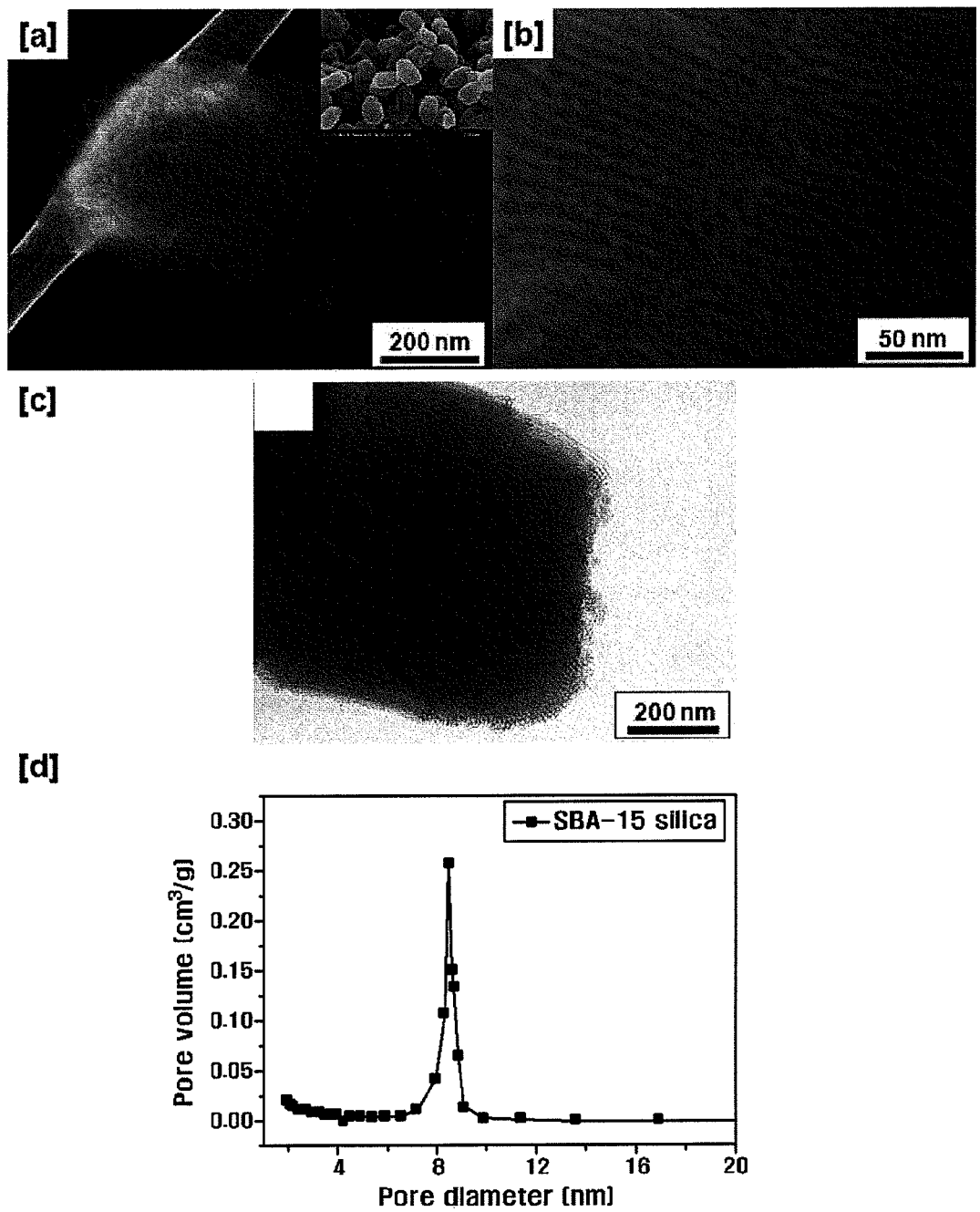
FIG. 5 shows (a) an SEM image, (b) an HR-SEM image, (c) a TEM image, and (d) a pore size distribution curve of an SBA-15 silica template according to a specific embodiment of the present disclosure.
Figure 6:
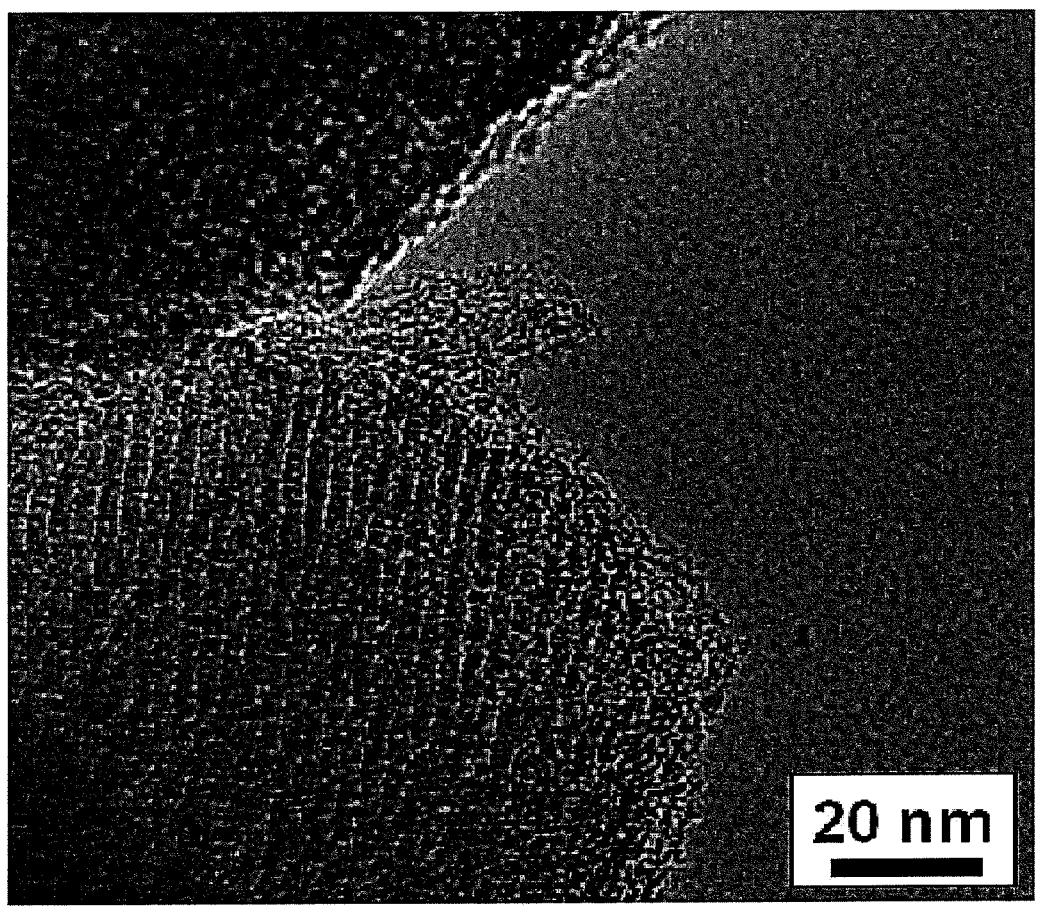
FIG. 6 shows an HR-TEM image of CMK-3 carbon according to a specific embodiment of the present disclosure.

FIG. 4 and FIG. 6 show high-resolution transmission electron microscopic (HR-TEM) images or parent SBA-15 silica and mesoporous carbon CMK-3, viewed along and perpendicular to the direction of a hexagonal pore arrangement. FIG. 5 shows (a) an SEM image, (b) an HR-SEM image, (c) a TEM image, and (d) a pore size distribution curve of the SBA-15 silica template. The structure of SBA-15 consists of a hexagonal arrangement of cylindrical mesoporous tubes 8.5 nm in diameter, which is similar to the structure of the honeycomb-like MCM-41 silica. SBA-15 reveals a rod-type structure, ca. 1.2 μm in length and ca. 500 nm in diameter. CMK-3 particles have exactly the same rod-type geometry as that of the SBA-15 silica.

Figure 7:
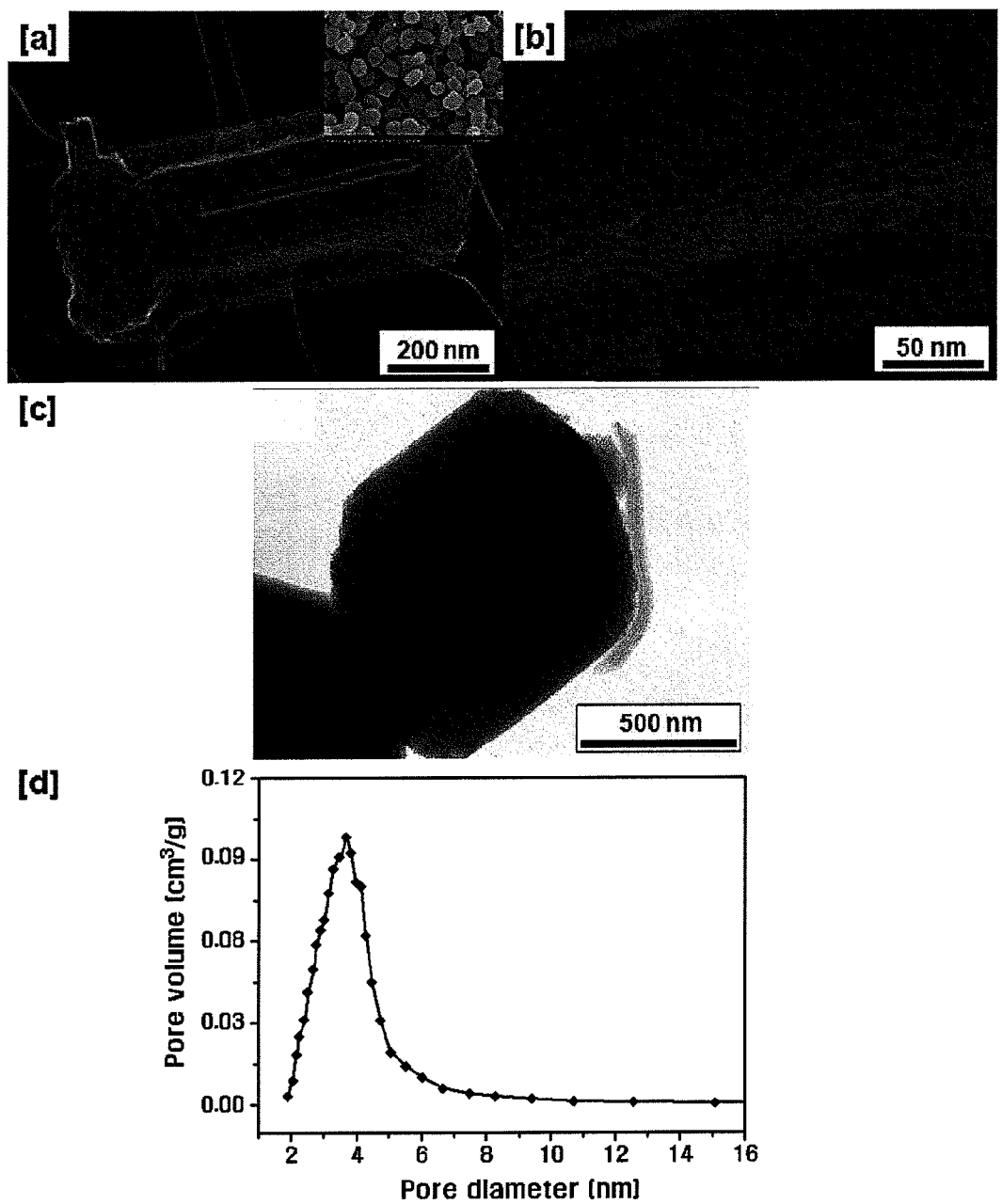
FIG. 7 shows (a) an SEM image, (b) an HR-SEM image, (c) a TEM image, and (d) a pore size distribution curve of CMK-3 carbon according to a specific embodiment of the present disclosure.

FIG. 7 shows (a) an SEM image, (b) an HR-SEM image, (c) a TEM image, and (d) a pore size distribution curve of CMK-3 carbon. The figure shows that the structure of the CMK-3 carbon is exactly an inverse replica of the parent SBA-15. The fact that the carbon particles are not hollow indicates that the formation of the carbon structure occurred uniformly through the entire mesopores volume of the SBA-15 particle.

Figure 8:
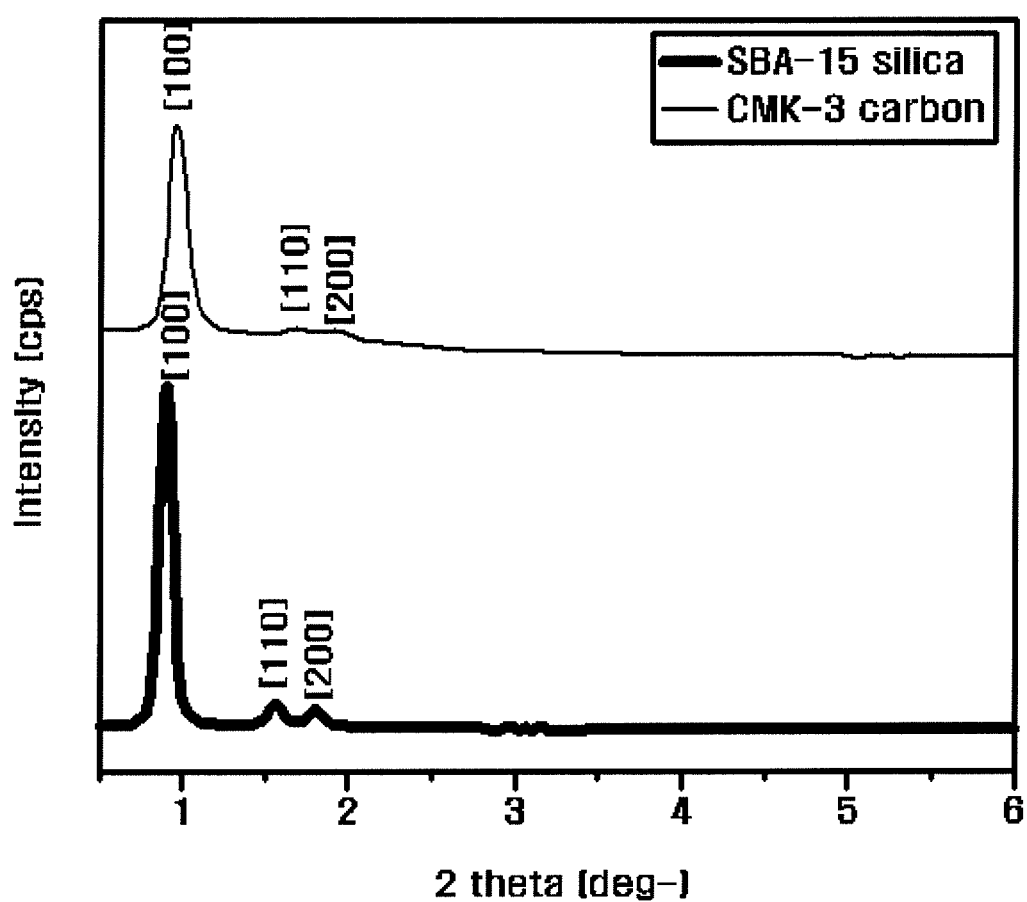
FIG. 8 shows X-ray diffraction (XRD) patterns of SBA-15 silica and CMK-3 carbon according to a specific embodiment of the present disclosure.

The ordered arrangement of mesopores channels in the silica (SBA-15) and the carbon (CMK-3) nanorods gives rise to the well-resolved XRD peaks as shown in FIG. 8, which can be assigned to (100), (110) and (200) diffractions of the 2-D hexagonal group.

Figure 9:
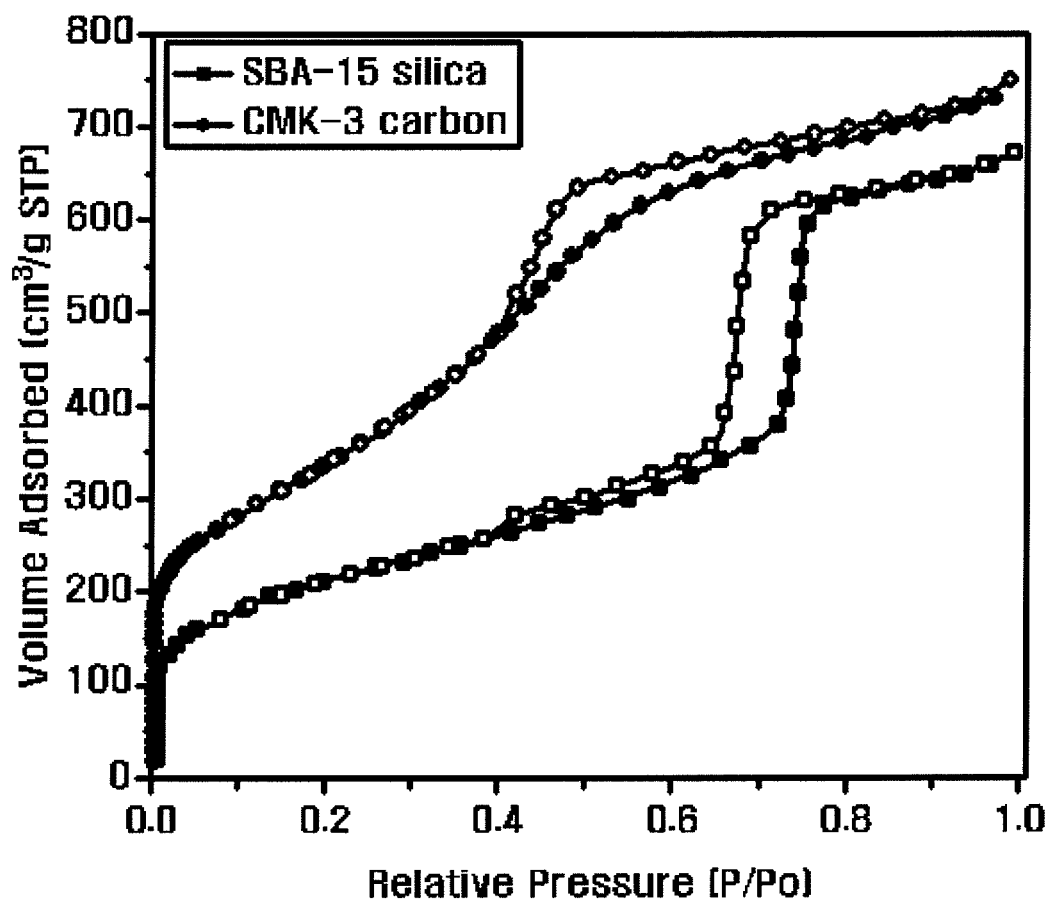
FIG. 9 shows nitrogen adsorption-desorption isotherms of SBA-15 silica and CMK-3 carbon according to a specific embodiment of the present disclosure.

FIG. 9 shows nitrogen adsorption-desorption isotherms of the SBA-15 silica and the CMK-3 carbon obtained at 77 K. It can be seen that the pore size distribution of SBA-15 is centered at 8.5 nm, while the carbon possesses mesopores with a quite narrow pore size distribution centered at 3.9 nm. The $N_2$ adsorption data for CMK-3 and SBA-15 provide the BET surface area of 1,210 $m^2$/g and 690 $m^2$/g, respectively, and the mesopore volume of 1.21 $cm^3$/g and 0.97 $cm^3$/g, respectively. The structural properties for all the synthesized samples are summarized in Table 1

TABLE 1

| | BET surface area ($m^2$/g) | Mesopore volume ($cm^3$/g) | Pore diameter (nm) | d spacing (nm) | XRD unit cell parameter (nm) | Wall thickness (nm) |
|---|---|---|---|---|---|---|
| SBA-15 silica | 690 | 0.97 | 8.5 | 9.71 | 11.21 | 2.7 |
| CMK-3 carbon | 1,210 | 1.21 | 3.9 | 9.12 | 10.53 | 6.6 |
| Ex. 1 (MCM-41) | 710 | 1.06 | 3.0 | 3.84 | 4.43 | 1.4 |
| Ex. 2 (MCM-48) | 1,260 | 1.32 | 2.6 | 3.25 | 7.96 | 1.2 |
| Ex. 3 (SBA-15) | 750 | 1.09 | 6.2 | 9.67 | 11.17 | 4.9 |
| Ex. 4 (SBA-16) | 620 | 0.93 | 4.9 | 7.43 | 8.58 | 3.7 |

Figure 10:
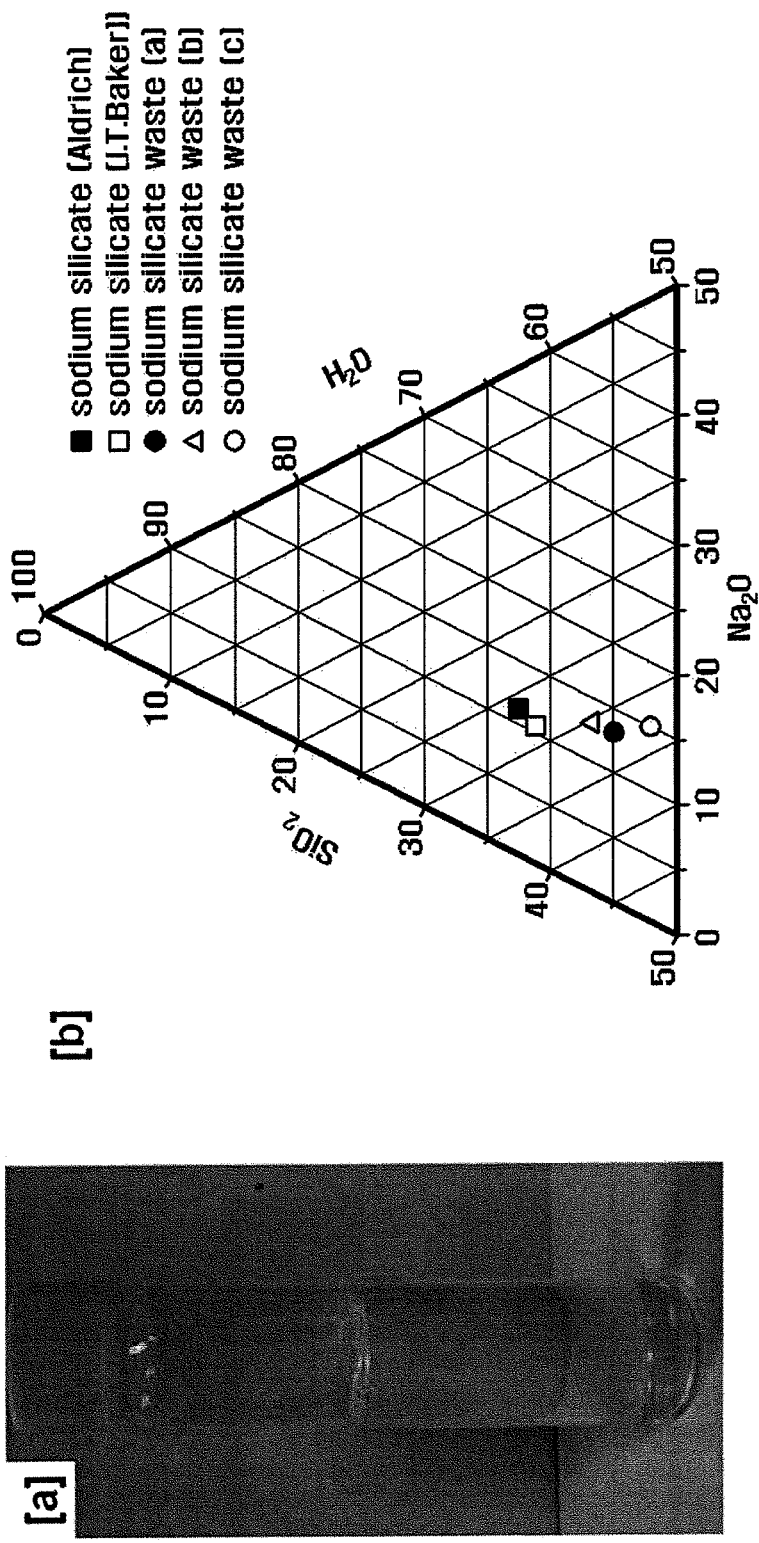
FIG. 10 shows a photograph of a purified silica waste according to a specific embodiment of the present disclosure and constituents thereof.

A photograph of the first filtered effluent containing the silica waste (FIG. 10 (*a*)) confirms that the slightly turbid solution was retrieved from the silica-carbon composite. FIG. 10 (*b*) is a ternary diagram of $Na_2O$—$SiO_2$—$H_2O$ showing the composition of commercially available sodium silicate solutions (J. T. Baker and Aldrich) and three different etched silica wastes. The main compositions in the commercially available sodium silicates and the silica wastes were identified by ICP-MS. Based on chemical analysis of a pure sodium silicate solution, the weight ratio of silica ($SiO_2$) to sodium oxide ($Na_2O$) was found to be 2.31-2.36, which was close to the value for the commercially available sodium silicate solutions (Aldrich, $SiO_2/Na_2O$=2.5). The physical and chemical properties of the commercially available sodium silicates and the silica wastes are shown in Table 2.

TABLE 2

|  | $Na_2O$ (wt %) | $SiO_2$ (wt %) | $H_2O$ (wt %) | Carbon (wt %) | Density (g/cm$^3$) | Viscosity (mPa s) | pH |
|---|---|---|---|---|---|---|---|
| Sodium silicate (Aldrich) | 10.6 | 26.5 | 62.9 | — | 1.24 | 6.15 | 11.9 |
| Sodium silicate (J. T. Baker) | 9.1 | 29.6 | 61.3 | — | 1.25 | 6.18 | 11.6 |
| Silica waste (a) | 13.6 | 31.4 | 54.8 | 0.19 | 1.36 | 34.4 | 12.1 |
| Silica waste (b) | 12.8 | 30.3 | 56.7 | 0.17 | 1.32 | 33.9 | 12.0 |
| Silica waste (c) | 14.2 | 33.2 | 52.4 | 0.24 | 1.39 | 35.3 | 12.1 |

In Table 2, density and viscosity were measured at 23.5° C., and pH was measured at 25° C.

The raw silica waste sample usually contains approximately 5 wt % of carbon debris. However, the final filtered silica waste obtained through purification contains less than 0.3 wt % carbon impurity. Particularly, the pH, density and viscosity of the silica sample solutions were very similar to each other with about 12.0, 1.36 g/cm$^3$ and 34.5 mPas, respectively. The pH and density values of the silica etching samples were slightly higher, but the viscosity values were about 5 times higher than those of the commercially available sodium silicates probably due to higher $Na_2O$ and $SiO_2$ contents in less amount of water.

Spherical primary particles of recycled MCM-41 and MCM-48 were also prepared using the silica waste as a silica precursor and CTAB as a structure-directing agent.

Figure 11:
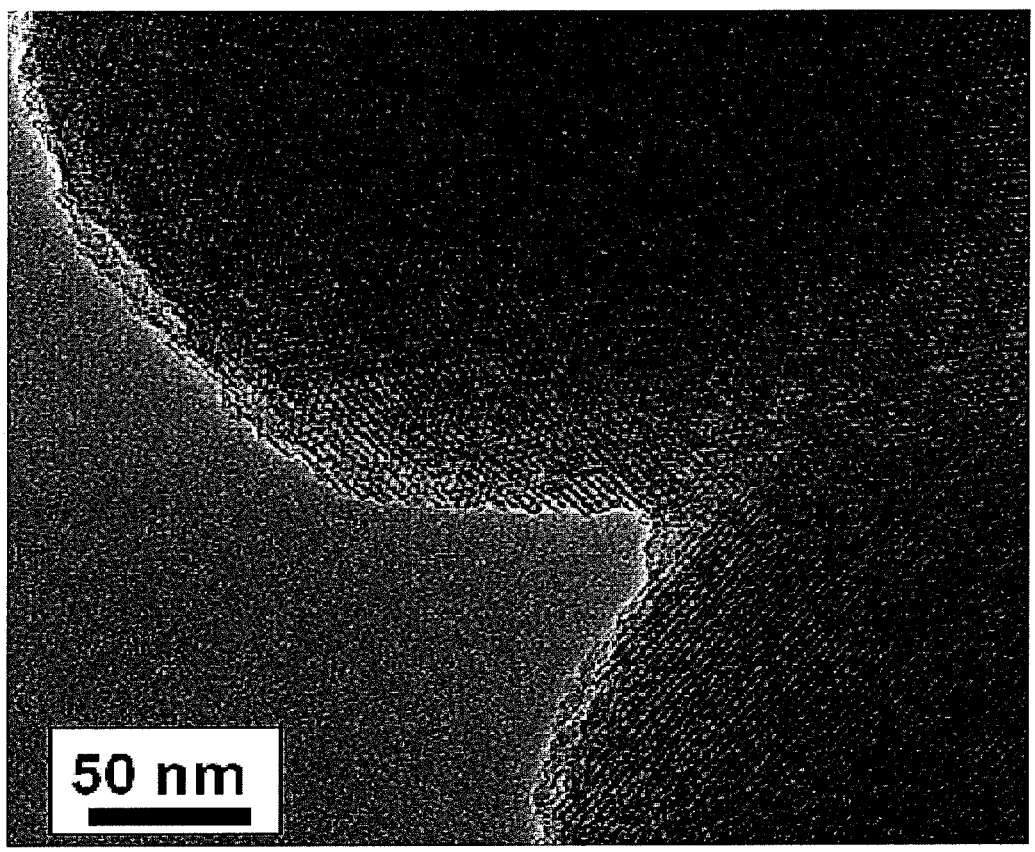
FIG. 11 shows an HR-TEM image of recycled mesoporous MCM-41 according to a specific embodiment of the present disclosure.
Figure 12:
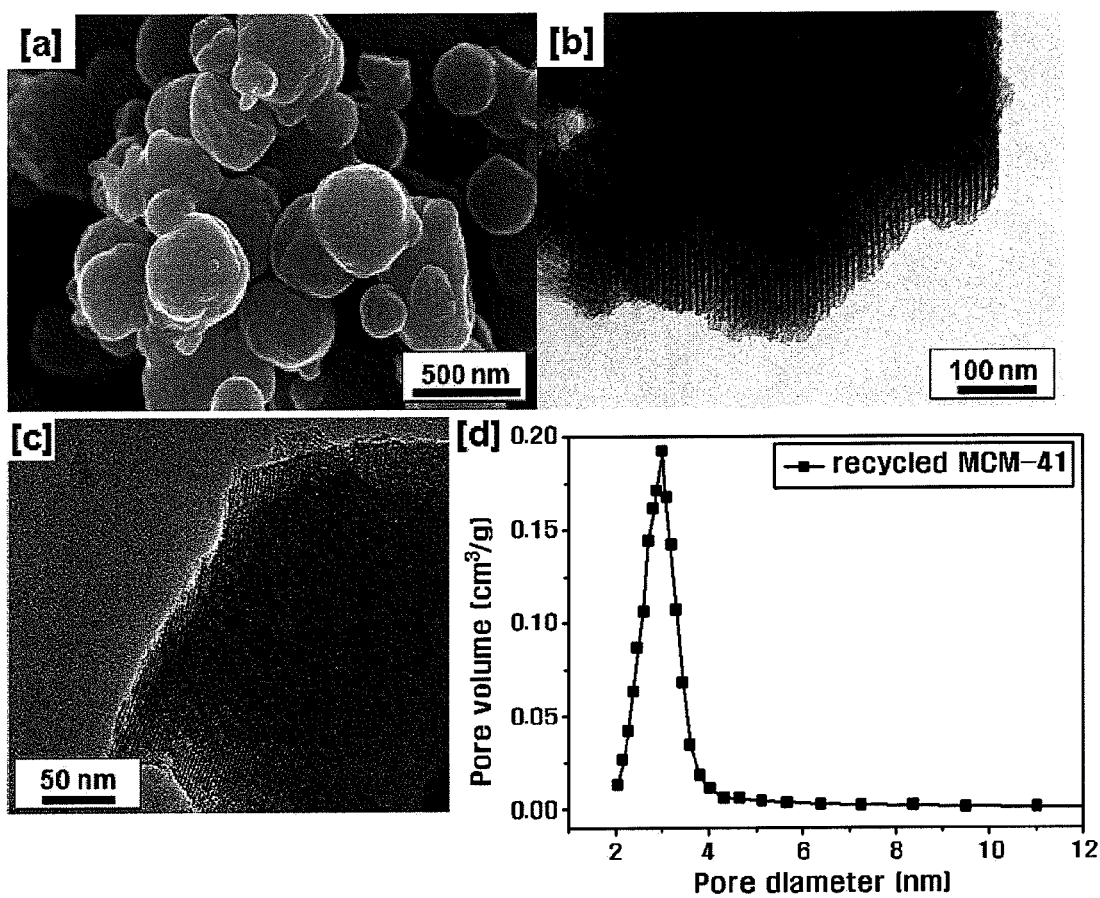
FIG. 12 shows (a) an SEM image, (b) a TEM image, (c) an HR-TEM image, and (d) a pore size distribution curve of recycled MCM-41 silica prepared from silica waste according to a specific embodiment of the present disclosure.
Figure 13:
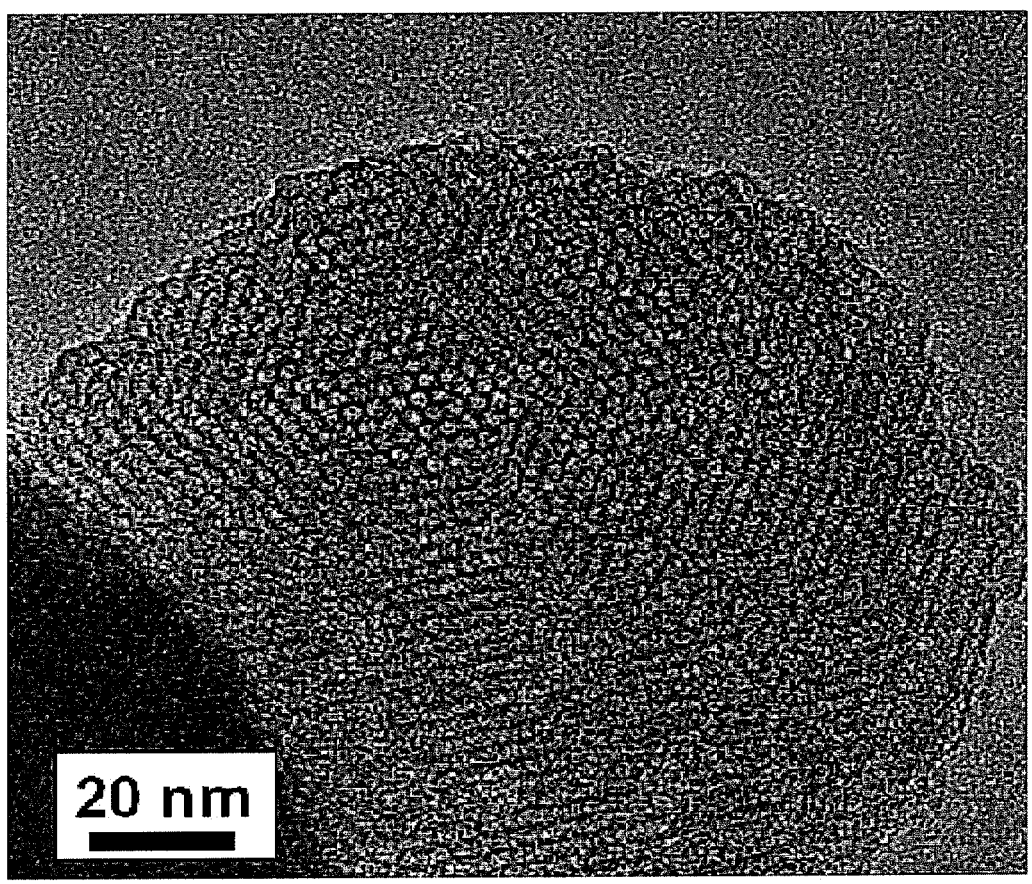
FIG. 13 shows an HR-TEM image of recycled mesoporous MCM-48 according to a specific embodiment of the present disclosure.
Figure 14:
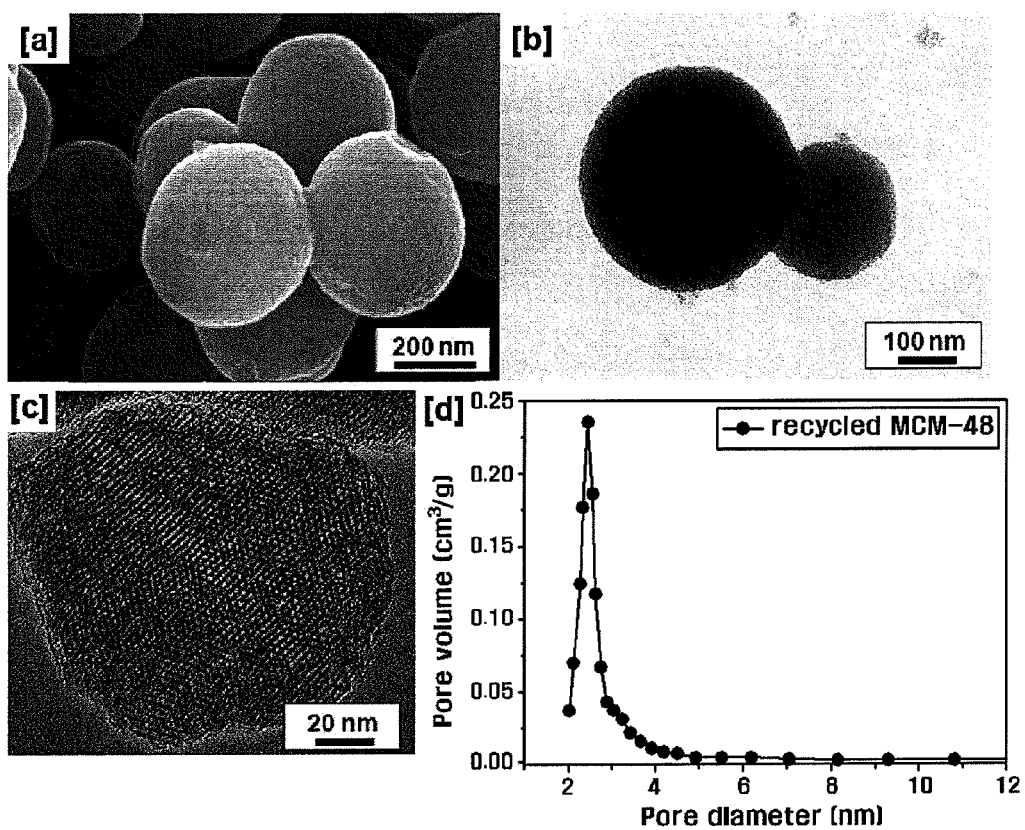
FIG. 14 shows (a) an SEM image, (b) a TEM image, (c) an HR-TEM image, and (d) a pore size distribution curve of recycled MCM-48 silica prepared from silica waste according to a specific embodiment of the present disclosure.
Figure 15:
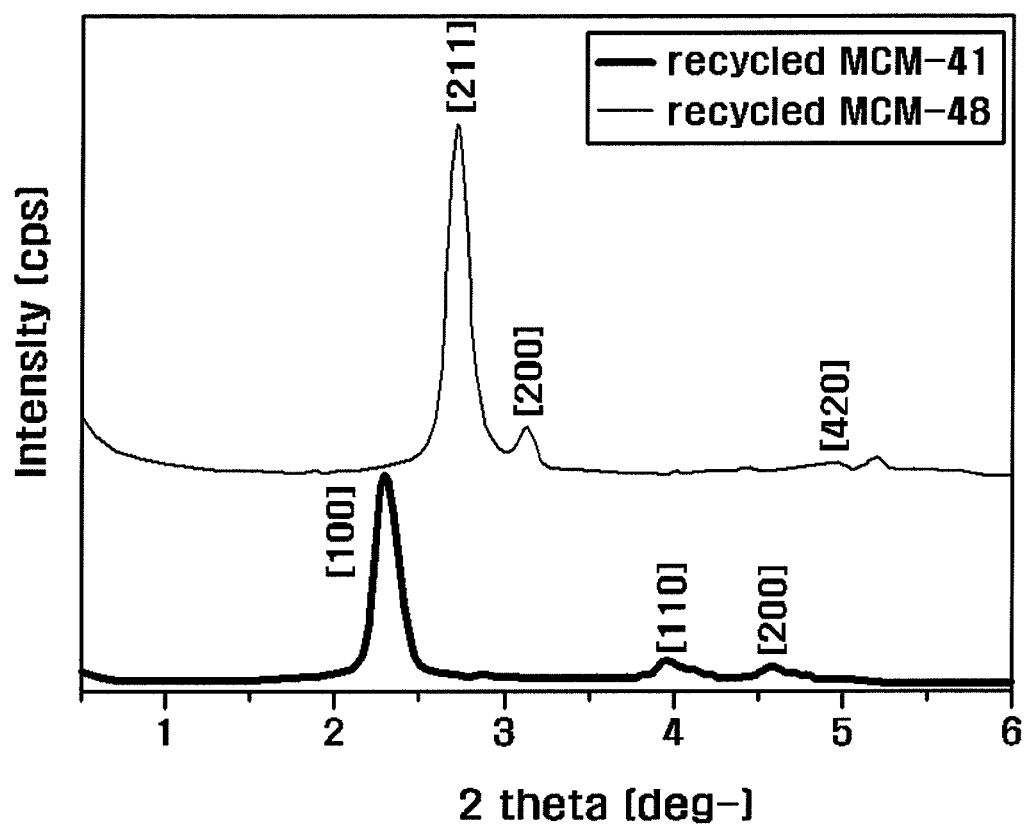
FIG. 15 shows XRD patterns of recycled mesoporous MCM-41 and mesoporous MCM-48 according to a specific embodiment of the present disclosure.
Figure 16:
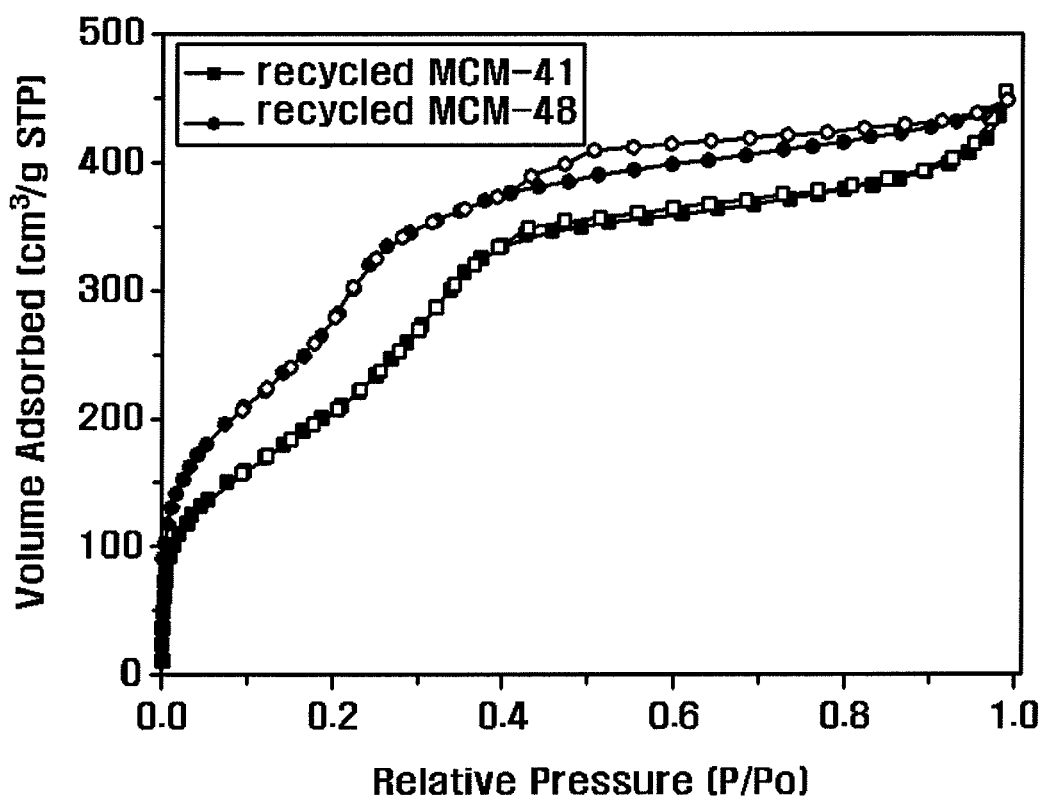
FIG. 16 shows nitrogen adsorption-desorption isotherms of recycled mesoporous MCM-41 and mesoporous MCM-48 according to a specific embodiment of the present disclosure.

FIG. 11 and FIG. 13 show the electron micrographs of the resulting recycled MCM-41 and MCM-48 primary particles. FIG. 12 shows (a) an SEM image, (b) a TEM image, (c) an HR-TEM image, and (d) a pore size distribution curve of the recycled MCM-41 silica prepared from silica waste. The particle size estimated from the TEM and SEM images was 250-600 nm for MCM-41 and 150-500 nm for MCM-48. Highly ordered mesoporous structures are clearly seen in the HR-TEM images of the recycled MCM-41 and MCM-48 silica. The XRD patterns of MCM-41 and MCM-48 are shown in FIG. 15, and the nitrogen adsorption-desorption isotherms are shown in FIG. 16.

The MCM-41 and MCM-48 samples show narrow pore size distribution centered at 3.0 and 2.6 nm, respectively. The BET surface area and mesopore volume of the MCM-41 silica were 710 m$^2$/g and 1.06 cm$^3$/g, respectively, while those of the MCM-48 silica were 1,260 m$^2$/g and 1.32 cm$^3$/g, respectively.

Figure 17:
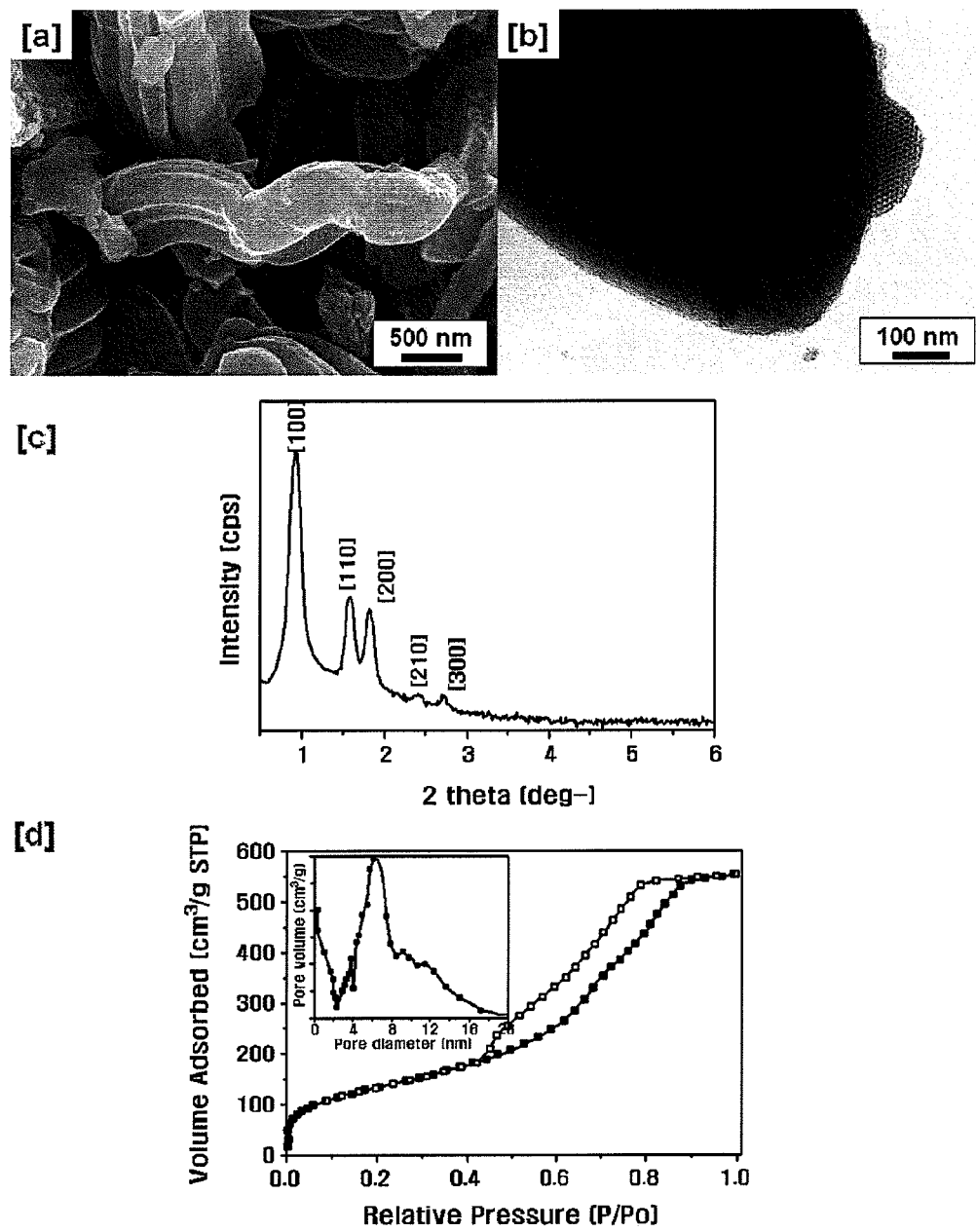
FIG. 17 shows (a) an SEM image, (b) a TEM image, (c) an XRD pattern, and (d) a nitrogen adsorption-desorption isotherm of recycled SBA-15-like silica according to a specific embodiment of the present disclosure.
Figure 18:
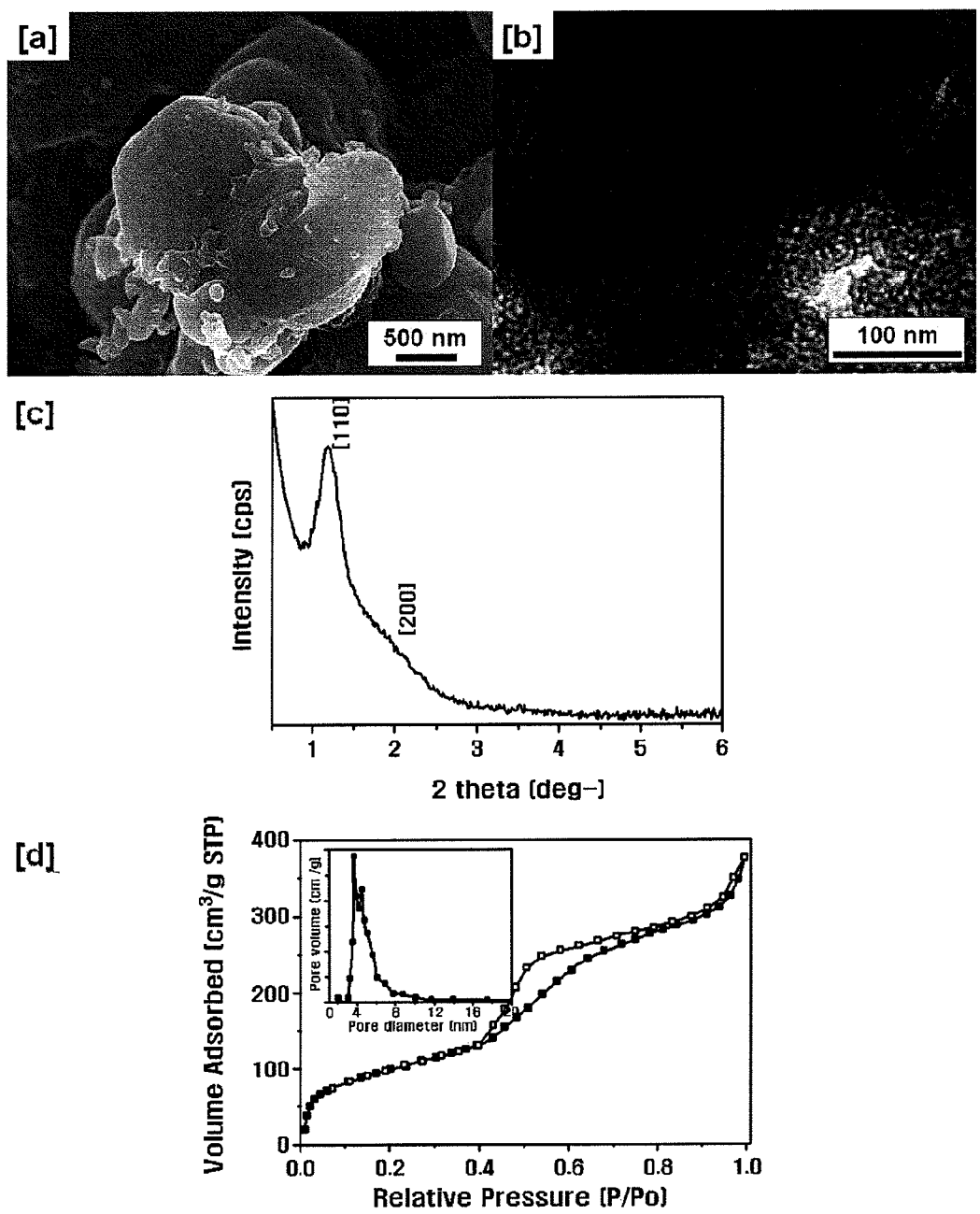
FIG. 18 shows (a) an SEM image, (b) a TEM image, (c) an XRD pattern, and (d) a nitrogen adsorption-desorption isotherm of recycled SBA-16-like silica according to a specific embodiment of the present disclosure.

FIG. 17 shows (a) an SEM image, (b) a TEM image, (c) an XRD pattern, and (d) a nitrogen adsorption-desorption isotherm of the recycled SBA-15-like silica, and FIG. 18 shows (a) an SEM image, (b) a TEM image, (c) an XRD pattern, and (d) a nitrogen adsorption-desorption isotherm of the recycled SBA-16-like silica.

The XRD patterns and the high-resolution electron microscopic images of the recycled SBA-15-like and SBA-16-like silica were similar to that of SBA-15 and SBA-16, respectively. The BET surface area and mesopore volume were 750 m$^2$/g and 1.09 cm$^3$/g, respectively, for the SBA-15 silica, and 620 m$^2$/g and 0.93 cm$^3$/g, respectively, for the SBA-16 silica.

FIG. 19 shows SEM and TEM images of recycled ZSM-5 prepared from silica waste using TPAOH as a template agent for ZSM-5 with Si/Al=35.

FIG. 20 shows XRD patterns of recycled ZSM-5 (prepared using TPAOH) prepared with different molar ratios of Si to Al (a) in as-synthesized state and (b) in calcined state.

FIG. 21 shows TEM images for silica spheres with different sizes prepared from silica waste of different concentrations as shown for $SiO_2$-25, $SiO_2$-100, $SiO_2$-200 and $SiO_2$-400, respectively, where number indicates the silica waste concentration (mol/liter) used As described, the present disclosure allows recycling of the silica waste in an effective and environment-friendly manner, reduction of consumption of chemical materials, and reduction of chemical waste. Accordingly, the present disclosure enables effective preparation of nanoporous silica, silica spheres and other silica materials from silica waste generated for production of various nanoporous materials.

The present disclosure will make a good example of green chemistry for saving chemicals and protecting the environment. The present disclosure is also applicable to microporous zeolite, silica spheres and others silica materials in addition to the mesoporous silica materials.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing nanoporous or spherical material, comprising:
    preparing a silica precursor having a reduced carbon content comprising less than 0.3 wt. % of carbon by purifying a silica waste produced from a silica etching process in the synthesis of nanoporous carbon, said silica waste comprising an initial carbon content comprising greater than 0.3 wt. % of carbon; and
    introducing the silica precursor into a surfactant micelle as a structure-directing agent;
    wherein the nanoporous or spherical material is selected from mesoporous silica, microporous zeolite and silica spheres,
    wherein the purification of silica waste comprises subjecting the silica waste to filtration and sonication, and
    wherein the silica precursor has a weight ratio of silica ($SiO_2$) to sodium oxide ($Na_2O$) from 2.31 to 2.36 and a pH of approximately 12.

2. The method for preparing nanoporous or spherical material according to claim 1, wherein, in said preparing the silica precursor, the purification of the silica waste is performed by sonication and filtration through ultrafine filter paper.

3. The method for preparing nanoporous or spherical material according to claim 2, wherein the initial carbon content of the silica waste comprises approximately 5 wt % of carbon.

4. The method for preparing nanoporous or spherical material according to claim 1, wherein, in said preparing the silica precursor, the initial carbon content of the silica waste comprises approximately 5 wt % of carbon.

5. The method for preparing nanoporous or spherical material according to claim 1, wherein, in said introducing the silica precursor into the surfactant micelle, the surfactant is one or more selected from a group consisting of an ionic surfactant, an amphiphilic polymer surfactant, and an ethylene oxide/propylene oxide block copolymer.

6. A method for preparing nanoporous carbon, comprising:
   preparing the mesoporous silica prepared from the method for preparing mesoporous silica according to claim 1 as a template;
   filling a carbon source in the pores of the mesoporous silica and pyrolyzing the same to prepare a mesoporous silica/carbon composite; and
   etching the silica from the mesoporous silicacarbon composite.

7. A method for analyzing a nanoporous material, comprising analyzing structure and physical and chemical properties of the nanoporous silica prepared from the method for preparing nanoporous silica according to claim 1.

8. A method for analyzing a nanoporous material, comprising analyzing structure and physical and chemical properties of the nanoporous carbon prepared from the method for preparing nanoporous carbon according to claim 6.

* * * * *